United States Patent
Webb et al.

(10) Patent No.: US 8,225,300 B1
(45) Date of Patent: Jul. 17, 2012

(54) CLIENT PROGRAM EXECUTABLE ON MULTIPLE HETEROGENEOUS SERVER PLATFORMS

(75) Inventors: Peter Hartwell Webb, Newton, MA (US); Loren Dean, Natick, MA (US); Anthony Paul Astolfi, Framington, MA (US); Jocelyn Luke Martin, Burwell (GB); Richard John Alcock, Impington (GB); James T. Stewart, Newton, MA (US)

(73) Assignee: The Mathworks, Inc., Natick, MA (US)

( * ) Notice: Subject to any disclaimer, the term of this patent is extended or adjusted under 35 U.S.C. 154(b) by 981 days.

(21) Appl. No.: 12/181,815

(22) Filed: Jul. 29, 2008

Related U.S. Application Data

(63) Continuation-in-part of application No. 11/748,938, filed on May 15, 2007, now Pat. No. 8,010,954, which is a continuation-in-part of application No. 11/706,805, filed on Feb. 14, 2007, now Pat. No. 7,975,001, which is a continuation-in-part of application No. 11/748,947, filed on May 15, 2007, now Pat. No. 8,108,845, which is a continuation-in-part of application No. 11/706,805, filed on Feb. 14, 2007, now Pat. No. 7,975,001.

(60) Provisional application No. 61/054,288, filed on May 19, 2008.

(51) Int. Cl.
*G06F 9/45* (2006.01)
*G06F 9/445* (2006.01)
(52) U.S. Cl. ............... 717/149; 717/151; 717/154
(58) Field of Classification Search .......... 717/136–140, 717/147–156
See application file for complete search history.

(56) References Cited

U.S. PATENT DOCUMENTS

| | | | | |
|---|---|---|---|---|
| 4,961,133 | A * | 10/1990 | Talati et al. | 717/148 |
| 5,067,072 | A * | 11/1991 | Talati et al. | 717/148 |
| 5,355,492 | A * | 10/1994 | Frankel et al. | 717/151 |
| 5,999,987 | A * | 12/1999 | O'Farrell et al. | 719/330 |
| 6,092,097 | A * | 7/2000 | Suzuoka | 709/201 |
| 6,253,369 | B1 * | 6/2001 | Cloud et al. | 717/136 |
| 6,609,248 | B1 * | 8/2003 | Srivastava et al. | 717/147 |
| 7,103,881 | B2 * | 9/2006 | Stone | 717/148 |
| 7,111,132 | B2 * | 9/2006 | Wilkerson | 711/154 |
| 7,174,381 | B2 * | 2/2007 | Gulko et al. | 709/226 |
| 7,346,898 | B2 * | 3/2008 | Tserng | 717/140 |
| 7,640,266 | B2 * | 12/2009 | Gestrelius et al. | 1/1 |
| 7,673,295 | B1 * | 3/2010 | Lin | 717/156 |
| 7,689,977 | B1 * | 3/2010 | Zhang et al. | 717/149 |
| 7,739,667 | B2 * | 6/2010 | Callahan et al. | 717/128 |
| 7,765,532 | B2 * | 7/2010 | Dutt et al. | 717/149 |
| 7,797,691 | B2 * | 9/2010 | Cockx et al. | 717/155 |
| 7,810,084 | B2 * | 10/2010 | Egetoft | 717/149 |
| 7,840,949 | B2 * | 11/2010 | Schumacher et al. | 717/149 |
| 7,962,906 | B2 * | 6/2011 | O'Brien et al. | 717/160 |
| 7,975,001 | B1 | 7/2011 | Stefansson et al. | |

(Continued)

OTHER PUBLICATIONS

Nakazawa et al, "The MHETA execution model for heterogeneous clusters", IEEE, pp. 1-11, 2005.*

(Continued)

*Primary Examiner* — Anil Khatri
(74) *Attorney, Agent, or Firm* — Harrity & Harrity, LLP

(57) ABSTRACT

A device receives a program that includes one of a parallel construct or a distributed construct, creates a target component from the program, and integrates the target component into a target environment to produce a client program that is executable on multiple heterogeneous server platforms.

74 Claims, 14 Drawing Sheets

U.S. PATENT DOCUMENTS

| | | | |
|---|---|---|---|
| 7,996,827 B2 * | 8/2011 | Vorbach et al. | 717/149 |
| 8,006,238 B2 * | 8/2011 | Eichenberger et al. | 717/150 |
| 8,010,954 B2 | 8/2011 | Little et al. | |
| 8,037,462 B2 * | 10/2011 | Archambault et al. | 717/149 |
| 8,108,845 B2 * | 1/2012 | Little et al. | 717/149 |
| 2009/0044179 A1 | 2/2009 | Luszczek et al. | |
| 2009/0044180 A1 | 2/2009 | Luszczek et al. | |
| 2009/0044196 A1 | 2/2009 | Stefansson et al. | |
| 2009/0044197 A1 | 2/2009 | Stefansson et al. | |
| 2009/0049435 A1 | 2/2009 | Luszczek et al. | |
| 2009/0119677 A1 | 5/2009 | Stefansson et al. | |
| 2009/0132867 A1 | 5/2009 | Stefansson et al. | |
| 2011/0035736 A1 | 2/2011 | Stefansson et al. | |
| 2011/0035737 A1 | 2/2011 | Stefansson et al. | |
| 2012/0011347 A1 | 1/2012 | Little et al. | |

OTHER PUBLICATIONS

Chiang et al, "Implicit Heterogeneous and Parallel Programming", ACM SIGSOFT, vol. 30, No. 3, pp. 1-6, 2005.*

Agarawal et al, "Helper locks for fork join parallel programming", ACM PPoPP, pp. 245-256, 2010.*

Subhlok et al, A new model for integarted nested task and data parellel programming, ACM pp. 1-12, 1997.*

Willcock et al, "Active Pebbles: A programming model for highly parallel fine grained data driven computations", ACM PpoPP, pp. 305-306, 2011.*

Blake et al, "Evolution of threaded level parallelism in desktop applications", ACM ISCA, pp. 302-313, 2010.*

* cited by examiner

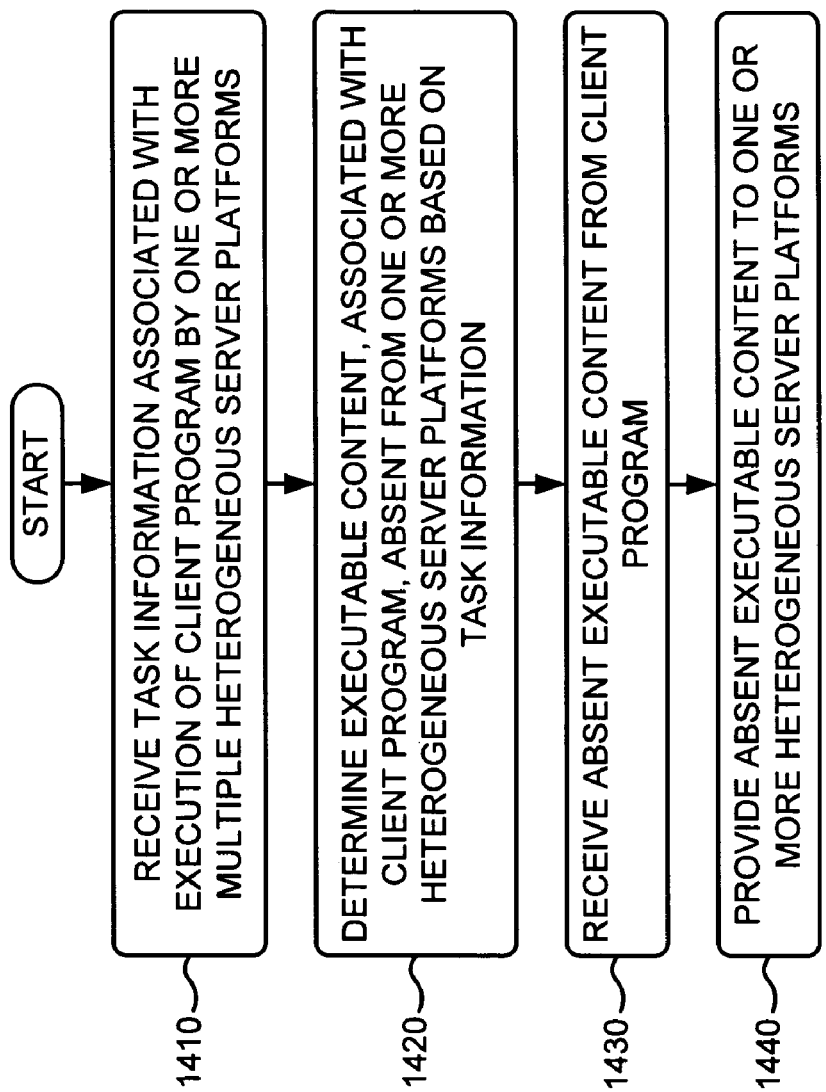

CLIENT PROGRAM EXECUTABLE ON MULTIPLE HETEROGENEOUS SERVER PLATFORMS

RELATED APPLICATIONS

This application is a continuation-in-part of U.S. patent application Ser. No. 11/748,938, filed May 15, 2007, which is a continuation-in-part of U.S. patent application Ser. No. 11/706,805, filed Feb. 14, 2007. This application is also a continuation-in-part of U.S. patent application Ser. No. 11/748,947, filed May 15, 2007, which is a continuation-in-part of U.S. patent application Ser. No. 11/706,805, filed Feb. 14, 2007. This application further claims priority under 35 U.S.C. §119 based on U.S. Provisional Patent Application No. 61/054,288, filed May 19, 2008. The entire contents of U.S. patent application Ser. Nos. 11/748,938, 11/748,947, and 11/706,805 and U.S. Provisional Patent Application No. 61/054,288 are hereby incorporated by reference.

BACKGROUND

Closely-coupled processors (or hardware resources) may include additional processors, threads in a particular processor, additional cores in a central processing unit, additional processors mounted on the same substrate or board, and/or such devices provided within computers connected by a network fabric into a cluster, a grid, or a collection of resources.

Certain computations (e.g., parallel processing or parallel programming) may benefit from the availability of such hardware resources. For example, a complex simulation may run faster if the simulation is divided into portions and the portions are simultaneously run on a number of processing devices in a parallel fashion. Parallel computing arrangements may include a controller that determines how an application should be divided and what application portions go to which parallel processors. For example, a host computer that is running a simulation may act as the controller for a number of parallel processors.

In a distributed (or batch) computing arrangement, a client may provide a job to a scheduler. The scheduler may distribute the job into one or more tasks, and may provide the tasks to one or more hardware resources. The hardware resources may execute the tasks, and may provide results to the scheduler. The scheduler may combine the results into a single result, and may provide the single result to the client.

However, hardware resources implement multiple heterogeneous server platforms, and some of the server platforms may be incompatible with a parallel and/or distributed program. Thus, the parallel and/or distributed program may execute on hardware resources with compatible server platforms, but hardware resources with incompatible server platforms will be unavailable to the parallel and/or distributed program. This will limit the amount of hardware resources available to the parallel and/or distributed program.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 9-14 depict flow charts associated with exemplary processes according to implementations described herein.

DETAILED DESCRIPTION

Figure 1:
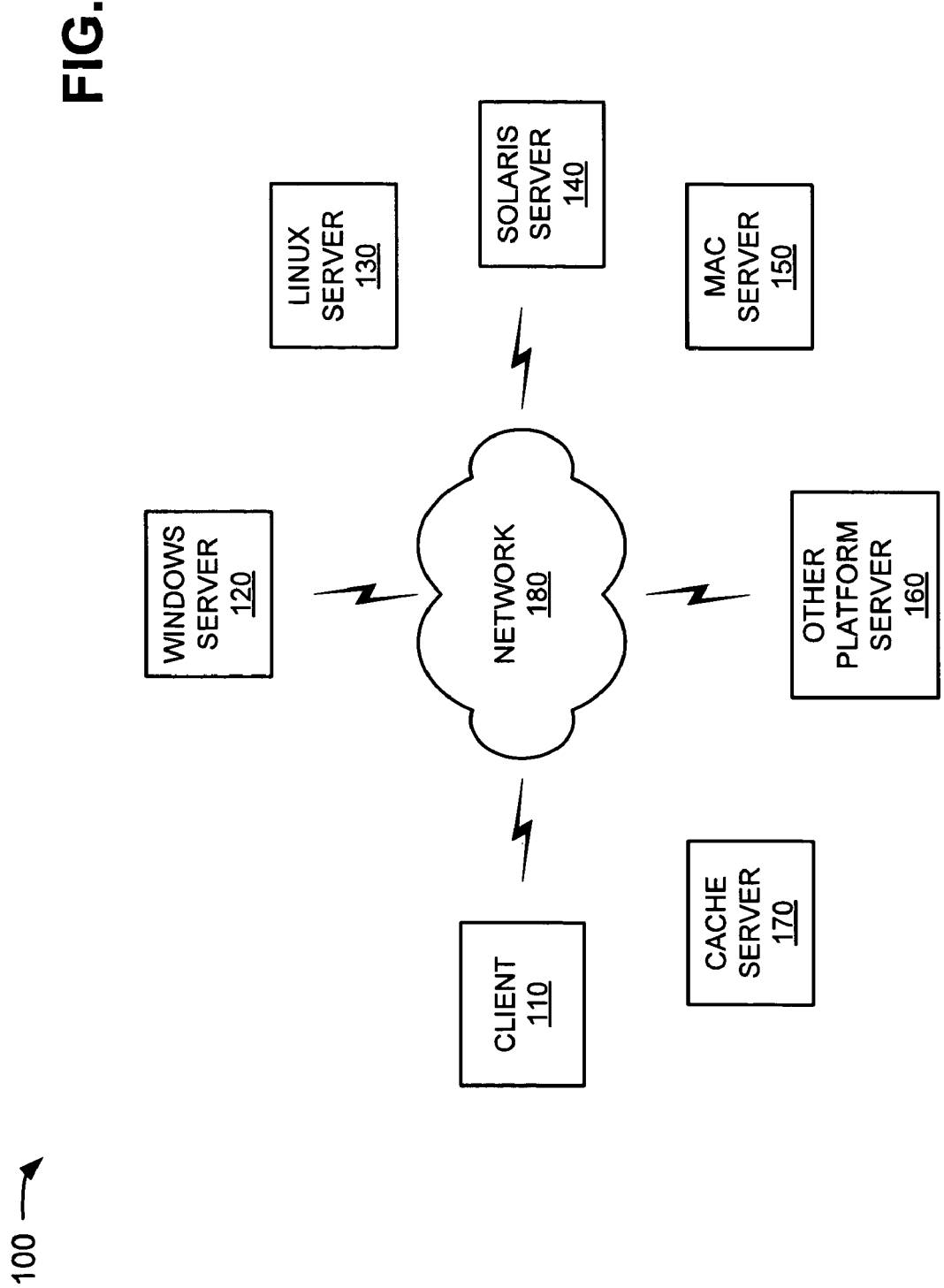
FIG. 1 is an exemplary diagram of a network in which systems and methods described herein may be implemented.

The following detailed description refers to the accompanying drawings. The same reference numbers in different drawings may identify the same or similar elements. Also, the following detailed description does not limit the invention.

Overview

Implementations described herein may include systems and/or methods that produce a client program that may be executable on multiple heterogeneous server platforms. For example, in one implementation, the systems and/or methods may receive and/or create a program (e.g., a technical computing environment (TCE) program) with a parallel or distributed construct, and may create a target component from the program. The systems and/or methods may identify executable content of the program executable outside the TCE, and may associate license information with the identified executable content of the program. The systems and/or methods may also combine the identified executable content of the program and the associated license information into a platform-independent, redistributable program, and may integrate the target component and the platform-independent, redistributable program into a target environment to produce a client program executable on multiple heterogeneous server platforms. The systems and/or methods may provide the client program to the multiple heterogeneous server platforms for execution.

A technical computing environment (TCE) may include any hardware, software, and/or a combination of hardware and software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a TCE may include a dynamically-typed programming language (e.g., the M language) that can be used to express problems and/or solutions in mathematical notations. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel processing, etc.). In another implementation, a TCE may provide these functions as block sets. In still another implementation, a TCE may provide these functions in another way, such as via a library, etc.

A TCE may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

A target environment may include an environment that supports a variety of programming languages. The target environment may include an environment that supports integration of a software component into a client program via one or more computer programming languages. Each of the one or more computer programming languages may be defined by a Type-0 grammar from the Chomsky hierarchy of formal languages. Each Type-0 grammar may define each of the one or more computer programming languages with a programming model, a type management model, and an instruction execution model. The programming model may be one of functional, object-oriented, procedural, rule based, logic based, or multi-paradigm. The type management model may be one of untyped, static, dynamic, or hybrid. The instruction execution model may be one of sequential or parallel. For example, in one implementation, a target environment may support one or more of a C programming language, a C++ programming language, a Csharp programming language, a Java programming language, a Visual Basic programming language, a .NET framework programming language, a Python programming language, a F++ programming language, a Fsharp programming language, a Fortress programming language, a Perl programming language, an X10 programming language, and/or a Chapel programming language.

Multiple heterogeneous server platforms may include a variety of server environments. The multiple heterogeneous server platforms may include a non-homogeneous set of Turing-complete computing resources capable of communicating with one another. Each member of the non-homogeneous set of Turing-complete computing resources may support server program execution via an operating system. For example, in one implementation, the multiple heterogeneous server platforms may support server program execution via one or more of a Linux operating system, a Windows operating system, a Solaris operating system, a Macintosh operating system, a UNIX-based operating system, and/or a real-time operating system (RTOS). In an exemplary implementation, servers containing multiple heterogeneous server platforms may include processing logic (e.g., labs, software or hardware units of execution, etc.), where the processing logic may be used to facilitate parallel or distributed processing.

A lab may include hardware, software, and/or combination of hardware and software that performs and/or participates in parallel and/or distributed processing activities. For example, a lab may perform and/or participate in parallel/distributed processing activities in response to a request and/or a task received from a client. In one example, a lab may be implemented as a software unit of execution and/or a hardware unit of execution. A lab may perform and/or participate in substantially any type of parallel processing (e.g., task, data, and/or stream processing). In one example, a lab may perform and/or participate in parallel processing activities in response to a receipt of a program and/or one or more portions of the program. A lab may support one or more threads (or processes) when performing processing operations.

A hardware unit of execution may include a device (e.g., a hardware resource) that performs and/or participates in parallel/distributed processing activities. For example, a hardware unit of execution may perform and/or participate in parallel/distributed processing activities in response to a request and/or a task received from a client. A hardware unit of execution may perform and/or participate in substantially any type of parallel processing (e.g., task, data, and/or stream processing) using one or more devices. For example, in one implementation, a hardware unit of execution may include a single processor that includes multiple cores and in another implementation, the hardware unit of execution may include a number of processors. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a worker, a lab, etc.) that performs and/or participates in parallel/distributed processing activities. For example, a software unit of execution may perform and/or participate in parallel/distributed processing activities in response to receipt of a program and/or one or more portions of the program. A software unit of execution may perform and/or participate in substantially any type of parallel processing using one or more hardware units of execution. A software unit of execution may support one or more threads (or processes) when performing processing operations.

Exemplary Network Configuration

FIG. 1 is an exemplary diagram of a network 100 in which systems and methods described herein may be implemented. As illustrated, network 100 may include a client 110, a Windows server 120, a Linux server 130, a Solaris server 140, a Macintosh server 150, an other platform server 160, and/or a cache server 170 interconnected by a network 180. Client 110 and/or servers 120-170 may connect to network 180 via wired and/or wireless connections. One client, six servers, and one network have been illustrated in FIG. 1 for simplicity. In practice, there may be more or less clients, servers, and/or networks. Also, in some instances, one or more of client 110 and/or servers 120-170 may perform one or more functions described as being performed by another one or more of client 110 and/or servers 120-170.

Client 110 may include a laptop, a personal computer, a workstation, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), or other types of computation or communication devices, threads or processes running on these devices, and/or objects executable by these devices. In one implementation, client 110 may produce a client program that may be executable on multiple heterogeneous server platforms (e.g., via servers 120-170), as described herein. Further details of client 110 are provided below in connection with, for example, FIGS. 2-5.

Windows server 120 may include one or more server entities, or other types of computation or communication devices, that gather, process, search, and/or provide information in a manner described herein. In one implementation, Windows server 120 may provide a Windows-based server platform (e.g., a Windows operating system) that is capable of executing one or more portions of the client program provided by client 110. Further details of Windows server 120 are provided below in connection with, for example, FIGS. 6-8.

Linux server 130 may include one or more server entities, or other types of computation or communication devices, that gather, process, search, and/or provide information in a manner described herein. In one implementation, Linux server 130 may provide a Linux-based server platform (e.g., a Linux operating system) that is capable of executing one or more portions of the client program generated client 110. Further details of Linux server 130 are provided below in connection with, for example, FIGS. 6-8.

Solaris server 140 may include one or more server entities, or other types of computation or communication devices, that gather, process, search, and/or provide information in a manner described herein. In one implementation, Solaris server 140 may provide a Solaris-based server platform (e.g., a Solaris operating system) that is capable of executing one or more portions of the client program provided by client 110. Further details of Solaris server 140 are provided below in connection with, for example, FIGS. 6-8.

Macintosh (MAC) server 150 may include one or more server entities, or other types of computation or communication devices, that gather, process, search, and/or provide information in a manner described herein. In one implementation, Macintosh server 150 may provide a Macintosh-based server platform (e.g., a Macintosh or Macintosh-compatible operating system) that is capable of executing one or more portions of the client program provided by client 110. Further details of Macintosh server 150 are provided below in connection with, for example, FIGS. 6-8.

Other platform server 160 may include one or more server entities, or other types of computation or communication devices, that gather, process, search, and/or provide information in a manner described herein. In one implementation, other platform server 160 may provide another server platform (e.g., a UNIX-based operating system) that is capable of executing one or more portions of the client program provided by client 110. Further details of other platform server 160 are provided below in connection with, for example, FIGS. 6-8.

Cache server 170 may include one or more server entities, or other types of computation or communication devices, that gather, process, search, and/or provide information in a manner described herein. In one implementation, cache server 170 may provide a distributed cache environment that is capable of receiving one or more portions of the client program provided by client 110. The distributed cache environment may distribute the one or more portions of the client program to one or more of servers 120-160. Further details of cache server 170 are provided below in connection with, for example, FIGS. 6-8.

Network 180 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks.

Exemplary Client and Server Configuration

Figure 2:
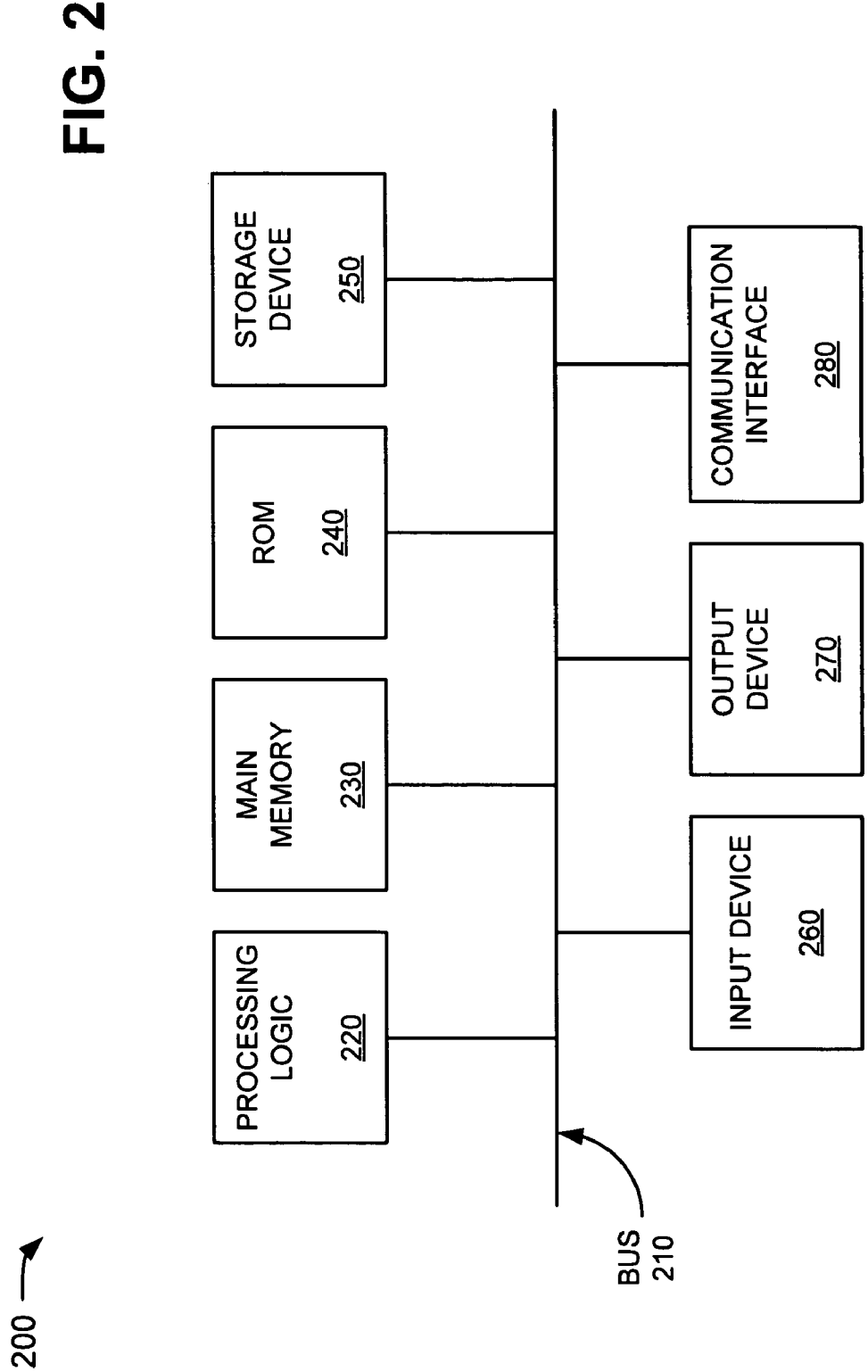
FIG. 2 illustrates exemplary components of a client and servers of the network depicted in FIG. 1.

FIG. 2 is an exemplary diagram of a device 200 that may correspond to client 110, Windows server 120, Linux server 130, Solaris server 140, Macintosh server 150, other platform server 160, and/or cache server 170. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 180.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Exemplary Client Configurations

Figure 3:
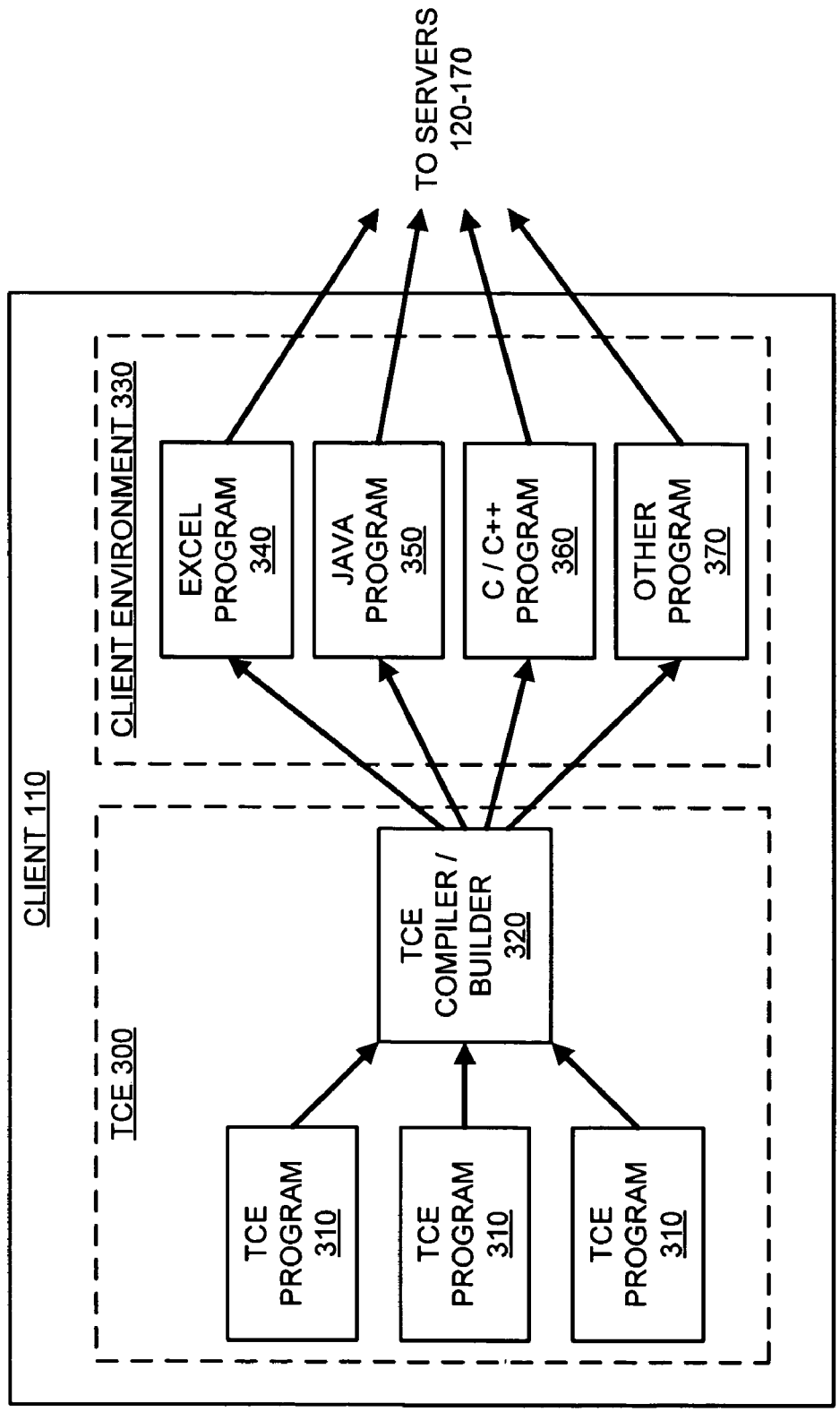
FIG. 3 depicts exemplary components of the client of the network illustrated in FIG. 1.

FIG. 3 depicts exemplary components of client 110. As illustrated, client 110 may include a technical computing environment (TCE) 300, which may further include TCE programs 310 and TCE compiler/builder logic 320; and a client environment 330, which may further include an Excel program 340, a Java program 350, a C/C++ program 360, and an other program 370.

Technical computing environment 300 may include any of the features described above with respect to the term "technical computing environment."

Each of TCE programs 310 may include a program capable of being created with and/or generated by technical computing environment 300. For example, in one implementation, each of TCE programs 310 may include a program with one or more parallel processing constructs that enable the one or more portions of the program to be executed in parallel with multiple hardware resources (e.g., one or more of servers 120-160). In one example, the parallel processing construct may include a single program, multiple data (SPMD) command. Client 110 may implement the SPMD command to generate program portions. In another example, the parallel processing construct may include a PARFOR command. Client 110 may implement the PARFOR command to generate program portions. In still another example, the parallel processing construct may include a PARSECTION command. Client 110 may implement the PARSECTION command to generate program portions. In an exemplary implementation, the one or more parallel processing constructs may be executed serially (e.g., by client 110) if multiple hardware resources (e.g., servers 120-160) are unavailable, and/or in parallel (e.g., by one or more of servers 120-160) if multiple hardware resources (e.g., servers 120-160) are available. Such an arrangement may permit portability of a client program (e.g., may permit the client program to execute on multiple heterogeneous server platforms).

In another exemplary implementation, each of TCE programs may include a program with one or more distributed computing constructs that enable the one or more portions of the program to be executed in a distributed manner with multiple hardware resources (e.g., one or more of servers 120-160).

TCE compiler/builder logic 320 may include hardware, software, and/or a combination of hardware and software based logic that may receive TCE programs 310, and may process TCE programs 310 to create target components (e.g., plugins) for integration into client environment 330. For example, TCE compiler/builder logic 320 may receive one of TCE programs 310, may create a target component (e.g., an Excel plugin) based on the one TCE program 310, and may provide the Excel plugin to Excel program 340. In another example, TCE compiler/builder logic 320 may receive one of TCE programs 310, may create a target component (e.g., a Java plugin) based on the one TCE program 310, and may provide the Java plugin to Java program 350. In still another example, TCE compiler/builder logic 320 may receive one of TCE programs 310, may create a target component (e.g., a C/C++ plugin) based on the one TCE program 310, and may provide the C/C++ plugin to C/C++ program 360. In a further example, TCE compiler/builder logic 320 may receive one of TCE programs 310, may create a target component (e.g., a plugin for another server platform) based on the one TCE program 310, and may provide the plugin to other program 370. In one exemplary implementation, the target components may implement the parallel processing constructs and/or the distributed computing constructs provided by TCE programs 310.

Client environment 330 may include one or more target environments. In one exemplary implementation, client environment 330 may include target environments, such as Excel program 340, Java program 350, C/C++ program 360, and other program 370.

Excel program 340 may include a program that may receive a target component (e.g., an Excel plugin) from TCE compiler/builder logic 320, and may integrate the Excel plugin into a target environment (e.g., Microsoft Excel) to create a client program (e.g., an Excel-based program) capable of being executed on multiple heterogeneous server platforms (e.g., servers 120-160). The client program created by Excel program 340 may be provided to the multiple heterogeneous server platforms (e.g., servers 120-160) for execution.

Java program 350 may include a program that may receive a target component (e.g., an Java plugin) from TCE compiler/builder logic 320, and may integrate the Java plugin into a target environment (e.g., a Java class library) to create a client program (e.g., a Java-based program) capable of being executed on multiple heterogeneous server platforms (e.g., servers 120-160). The client program created by Java program 350 may be provided to the multiple heterogeneous server platforms (e.g., servers 120-160) for execution.

C/C++ program 360 may include a program that may receive a target component (e.g., a C/C++ plugin) from TCE compiler/builder logic 320, and may integrate the C/C++ plugin into a target environment (e.g., a C/C++ programming environment) to create a client program (e.g., a C/C++-based program) capable of being executed on multiple heterogeneous server platforms (e.g., servers 120-160). The client program created by C/C++ program 360 may be provided to the multiple heterogeneous server platforms (e.g., servers 120-160) for execution.

Other program 370 may include a program that may receive a target component (e.g., a plugin for another server platform) from TCE compiler/builder logic 320, and may integrate the other plugin into a target environment (e.g., another server platform) to create a client program (e.g., another server platform-based program) capable of being executed on multiple heterogeneous server platforms (e.g., servers 120-160). The client program created by Other program 370 may be provided to the multiple heterogeneous server platforms (e.g., servers 120-160) for execution.

In one exemplary implementation, the client programs created by Excel program 340, Java program 350, C/C++ program 360, and other program 370 may be executed in a parallel manner and/or a distributed manner based on the parallel processing constructs and/or the distributed computing constructs implemented by the target components. In another exemplary implementation, the client programs created by Excel program 340, Java program 350, C/C++ program 360, and other program 370 may be provided to an end user (e.g., via computer readable media, via a web service that allows machine-to-machine communications over a network, etc.), and the end user may execute the client programs in a parallel manner and/or a distributed manner.

Although FIG. 3 shows exemplary components of client 110, in other implementations, client 110 may contain fewer, different, or additional components than depicted in FIG. 3. In still other implementations, one or more components of client 110 may perform one or more other tasks described as being performed by one or more other components of client 110.

Figure 4:
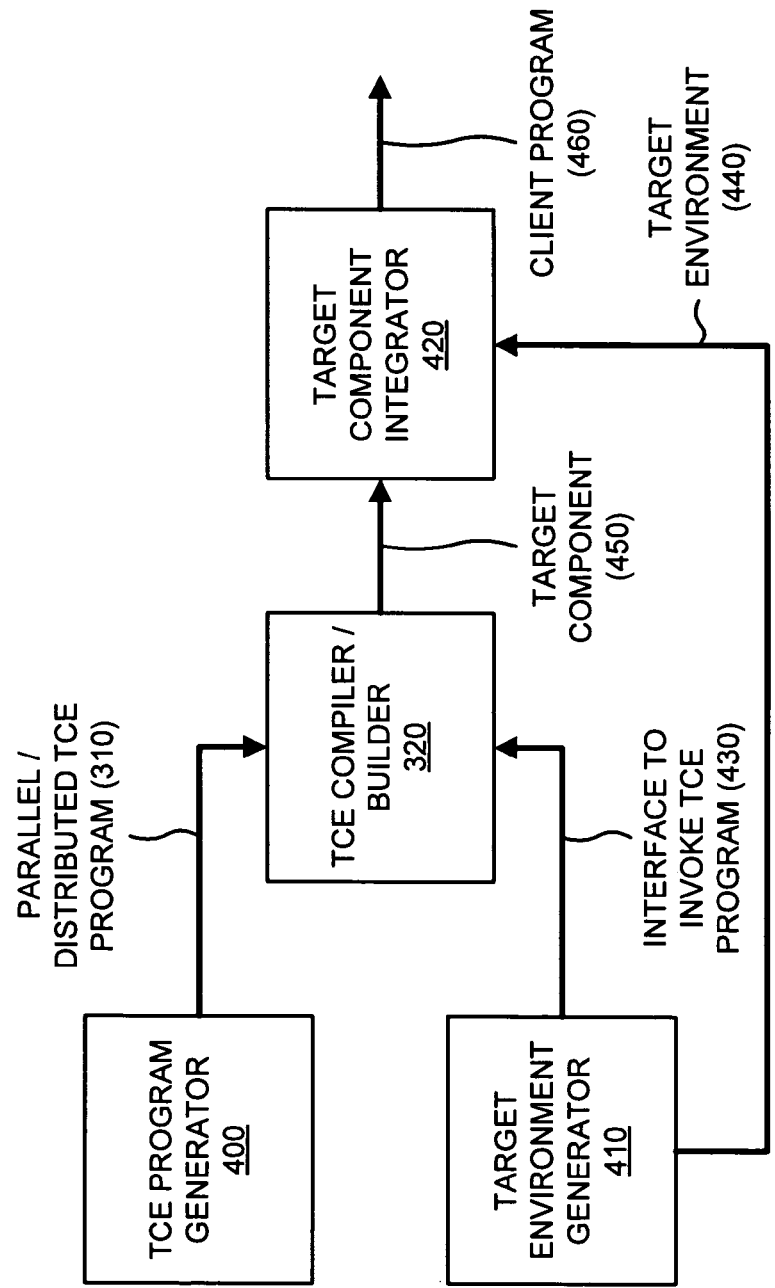
FIG. 4 illustrates exemplary functional components of the client of the network depicted in FIG. 1.

FIG. 4 illustrates exemplary functional components of client 110. As shown, client 110 may include TCE compiler/builder logic 320, TCE program generator logic 400, target environment generator logic 410, and target component integrator logic 420. TCE compiler/builder logic 320 may include the features described above in connection with FIG. 3.

TCE program generator logic 400 may include hardware, software, and/or a combination of hardware and software based logic that may generate TCE program 310 (e.g., a parallel and/or distributed TCE program). For example, in one implementation, TCE program generator logic 400 may generate a program with one or more parallel processing constructs that enable the one or more portions of the program to be executed in parallel with multiple hardware resources (e.g., one or more of servers 120-160). In another implementation, TCE program generator logic 400 may generate a program with one or more distributed computing constructs that enable the one or more portions of the program to be executed in a distributed manner with multiple hardware resources (e.g., one or more of servers 120-160). TCE program generator logic 400 may provide TCE program 310 to TCE compiler/builder logic 320.

Target environment generator logic 410 may include hardware, software, and/or a combination of hardware and software based logic that may generate an interface 430 to invoke TCE program 310 and may generate a target environment 440. Target environment generator logic 410 may provide interface 430 to TCE compiler/builder 320, and may provide target environment 440 to target component integrator 420. Target environment 440 may include any of the features described above with respect to the term "target environment."

TCE compiler/builder logic 320 may receive TCE program 310 from TCE program generator logic 400, and may receive interface 430 from target environment generator logic 410. TCE compiler/builder 320 may utilize TCE program 310 and interface 430 to generate a target component 450. Target component 450 may include a variety of target components (e.g., an Excel plugin, a Java plugin, a C/C++ plugin, etc.), and may include parallel processing constructs and/or the distributed computing constructs provided by TCE program 310. TCE compiler/builder 320 may provide target component 450 to target component integrator 420.

Target component integrator logic 420 may include hardware, software, and/or a combination of hardware and software based logic that may receive target environment 440 and target component 450, and may generate a client program 460 based on target environment 440 and target component 450. For example, in one implementation, target component integrator logic 420 may integrate target component 450 into target environment 440 to create client program 460 executable on multiple heterogeneous platform servers (e.g., servers 120-160). In one example, target component integrator logic 420 may reference interface 430 in target environment 440 and may invoke functions associated with interface 430 to create client program 460.

In one implementation, client program 460 may include an Excel-based program, a Java-based program, a C/C++-based program, etc. Client program 460 may be provided to multiple heterogeneous platform servers (e.g., servers 120-160), and may be executed in a parallel manner and/or a distributed manner by servers 120-160 based on the parallel processing constructs and/or the distributed computing constructs implemented by target component 450. Alternatively and/or additionally, client program 460 may be provided to an end user (e.g., via computer readable media, via a web service, etc.), and the end user may execute client program 460 in a parallel manner and/or a distributed manner with servers 120-160 based on the parallel processing constructs and/or the distributed computing constructs implemented by target component 450.

Although FIG. 4 shows exemplary functional components of client 110, in other implementations, client 110 may contain fewer, different, or additional functional components than depicted in FIG. 4. In still other implementations, one or more functional components of client 110 may perform one or more other tasks described as being performed by one or more other functional components of client 110.

Figure 5:
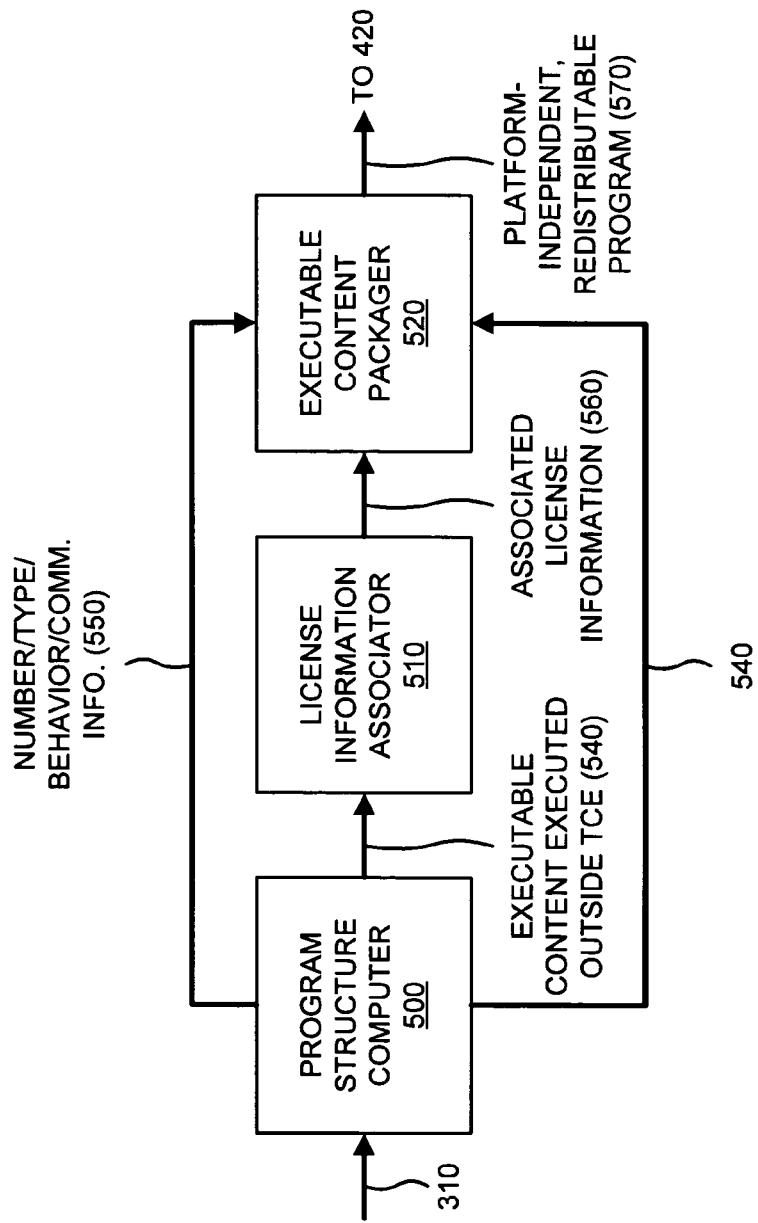
FIG. 5 depicts exemplary functional components of compiler/builder logic of the client illustrated in FIG. 4.

FIG. 5 depicts exemplary functional components of TCE compiler/builder logic 320 of client 110. As illustrated, client 110 may include program structure computer logic 500, license information associator logic 510, and executable content packager logic 520.

Program structure computer logic 500 may include hardware, software, and/or a combination of hardware and software based logic that may receive TCE program 310, and may determine executable content of TCE program 310 that may be executed outside TCE 300, as indicate by reference number 540. In one example, program structure computer logic 500 may analyze TCE program 310, and may identify executable content (e.g., functions) that may be required to execute TCE program outside TCE 300. Program structure computer logic 500 may provide the identified executable content 540 to license information associator logic 510 and executable content packager logic 520.

Program structure computer logic 500 may determine, based on TCE program 310, a number, types, behavior (e.g., failover support, etc.), and/or communication information, as indicated by reference number 550, associated with available hardware resources (e.g., servers 120-160). In one example, program structure computer logic 500 may determine that a number (e.g., two) of hardware resources (e.g., Windows server 120 and Linux server 130) are available, and that the available hardware resources are certain types (e.g., a Windows-based server platform and Linux-based server platform). In another example, program structure computer logic 500 may determine mechanisms (e.g., network 180) by which client 110 may communicate with the available hardware resources. In still another example, information 550 may include configuration information (e.g., to determine what server scheduling environment and/or target environment to use) associated with TCE program 310. The configuration information may be provided by a user, and, if not provided by the user, may be automatically provided by program structure computer logic 500 based on TCE program 310. Program structure computer logic 500 may provide information 550 to executable content packager logic 520.

License information associator logic 510 may include hardware, software, and/or a combination of hardware and software based logic that may receive identified executable content 540, and may associate license information, as indicated by reference number 560, with identified executable content 540. For example, in one implementation, license information associator logic 510 may extract license information from TCE 300, and may create a function that returns names of licensed products associated with identified executable content 540. If identified executable content 540 is invoked, associated license information 560 may be referenced (e.g., for valid licenses) so that identified executable content 540 may be executed with valid licenses. License information associator logic 510 may provide associated license information 560 to executable content packager logic 520.

Executable content packager logic 520 may include hardware, software, and/or a combination of hardware and software based logic that may receive identified executable content 540, information 550, and associated license information 560, and may combine identified executable content 540, information 550, and associated license information 560 into a platform-independent, redistributable program 570. In one implementation, platform-independent, redistributable program 570 may include target component 450 described above in connection with FIG. 4. Platform-independent, redistributable file 570 may provide configuration information for client program 460. The configuration information may enable client program 460 to arbitrarily target one or more of the multiple heterogeneous server platforms for execution. The configuration information may enable client program 460 to execute serially when none of the multiple heterogeneous server platforms are available to execute client program 460. The configuration information may enable client program 460 to select, at a time of execution, between serial execution and arbitrarily targeting one or more of the multiple heterogeneous server platforms for execution. Executable content packager logic 520 may provide platform-independent, redistributable program 570 to target component integrator logic 420. Target component integrator logic 420 may integrate platform-independent, redistributable program 570 into target environment 440 to create client program 460. For example, target component integrator logic 420 may invoke a build tool (e.g., a C++ compiler) appropriate for target environment 440, which may transform platform-independent, redistributable program 570 into client program 460.

Although FIG. 5 shows exemplary functional components of TCE compiler/builder logic 320, in other implementations, TCE compiler/builder logic 320 may contain fewer, different, or additional functional components than depicted in FIG. 5. In still other implementations, one or more functional components of TCE compiler/builder logic 320 may perform one or more other tasks described as being performed by one or more other functional components of TCE compiler/builder logic 320.

Exemplary Interactions of Servers

Figure 6:
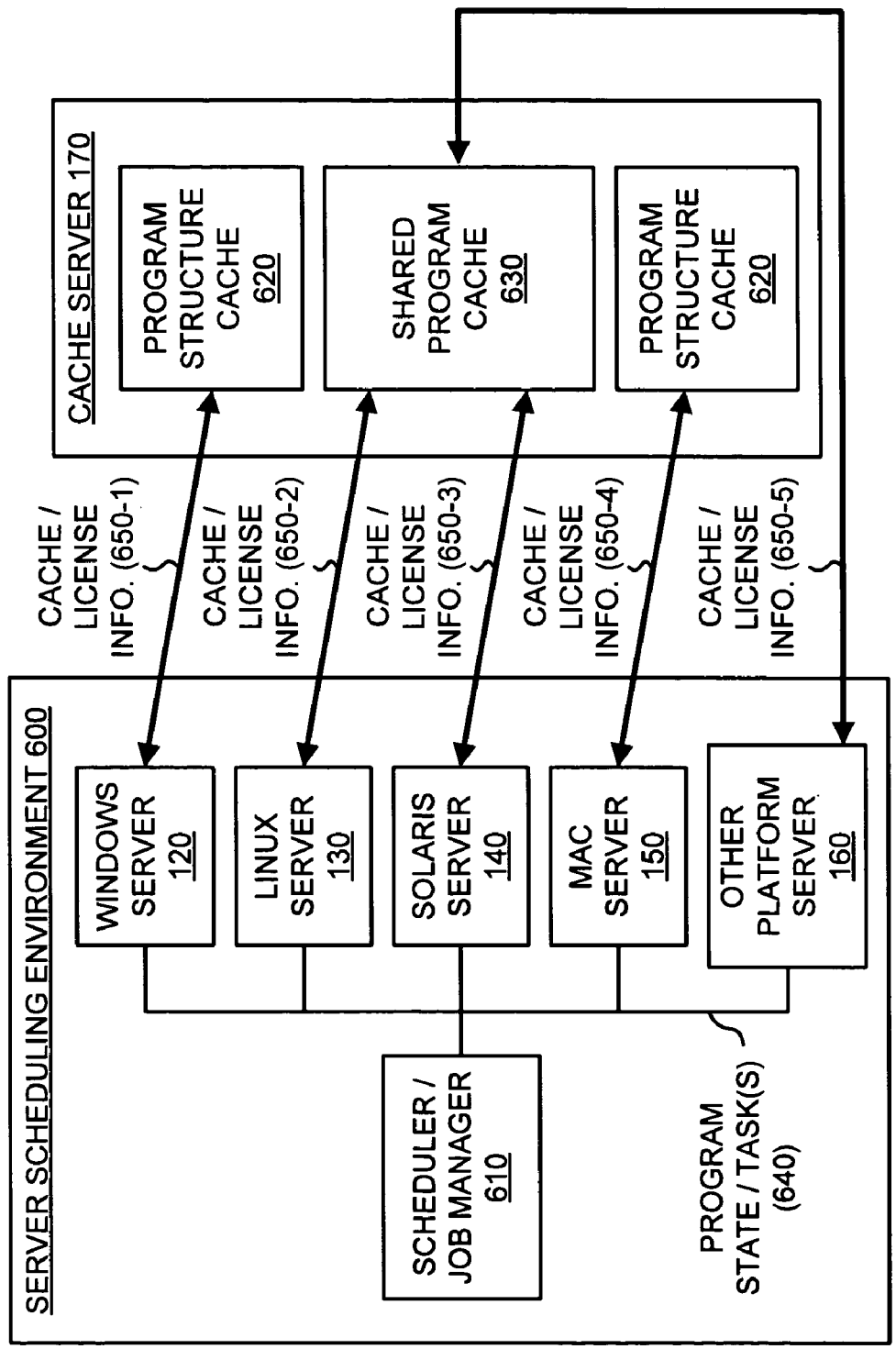
FIG. 6 illustrates an exemplary diagram of interactions between a server scheduling environment and a cache server of the network depicted in FIG. 1.

FIG. 6 illustrates an exemplary diagram of interactions between a server scheduling environment 600 and cache server 170. As shown, server scheduling environment 600 may include Windows server 120, Linux server 130, Solaris server 140, Macintosh server 150, other server 160, and a scheduler/job manager 610. As further shown, cache server 170 may include program structure cache 620 and shared program cache 630.

Scheduler/job manager 610 may include one or more server entities, or other types of computation or communication devices, that gather, process, search, and/or provide information in a manner described herein. In one implementation, scheduler/job manager 610 may manage program state and/or task(s) 640 (e.g., associated with a client program) and/or may assign program state/task(s) 640 to servers 120-160. Scheduler/job manager 610 may enable program state/task(s) 640 to be distributed across networks (e.g., network 180) of widely varying topologies. In one example, scheduler/job manager 610 may include an industry-standard scheduler, such as Platform LSF®, Microsoft® Windows® Compute Cluster Server (CCS), PBS Pro®, and TORQUE schedulers. Program state/task(s) 640 may include functions associated with a client program, program state information (e.g., run time information, variable values, call stack state, location of program, etc.), etc.

Program structure cache 620 may include one or more cache memories that may be used by a central processing unit (CPU) of a single computing device (e.g., Windows server 120) to reduce the average time to access a main memory (e.g., of Windows server 120), which may be slower and/or larger than internal memory used for cache. For example, as shown in FIG. 6, one program cache 620 may communicate with (e.g., be local to) a single server (e.g., Windows server 120), and another program cache 620 may communicate with another single server (e.g., Macintosh server 150).

Shared program cache 630 may include one or more cache memories that may be used by CPUs of multiple computing devices (e.g., Linux server 130 and Solaris server 140) to reduce the average time to access main memories (e.g., of Linux server 130 and Solaris server 140), which may be slower and/or larger than internal memory used for cache. For example, as shown in FIG. 6, shared program cache 630 may communicate with multiple servers (e.g., Linux server 130, Solaris server 140, and other platform server 160).

As further shown in FIG. 6, cache and/or license information 650-1, . . . , 650-5 may be exchanged between servers 120-160 and program cache 620 and shared program cache 630. Cache/license information 650-1, . . . , 650-5 may include executable content common to multiple parallel and/or distributed programs (e.g., client programs) and/or license information associated with the executable content. For example, one program structure cache 620 may share cache/license information 650-1 with Windows server 120. Shared program cache 630 may share cache/license information 650-2, 650-3, and 650-5 with Linux server 130, Solaris server 140, and other platform server 160, respectively. Another program structure cache 620 may share cache/license information 650-4 with Macintosh server 150.

Cache server 170 (e.g., program structure cache 620 and/or shared program cache 630) may reduce the cost of client (e.g., client 110) to server (e.g., servers 120-160) file transfer by requiring client 110 to transfer only executable content that is not present in cache server 170. The reduced client to server file transfer may also be beneficial if bandwidth (e.g., of network 180) is limited.

Although FIG. 6 shows exemplary interactions between server scheduling environment 600 and cache server 170, in other implementations, fewer, different, or additional interactions may occur between server scheduling environment 600 and cache server 170 than depicted in FIG. 6.

Figure 7:
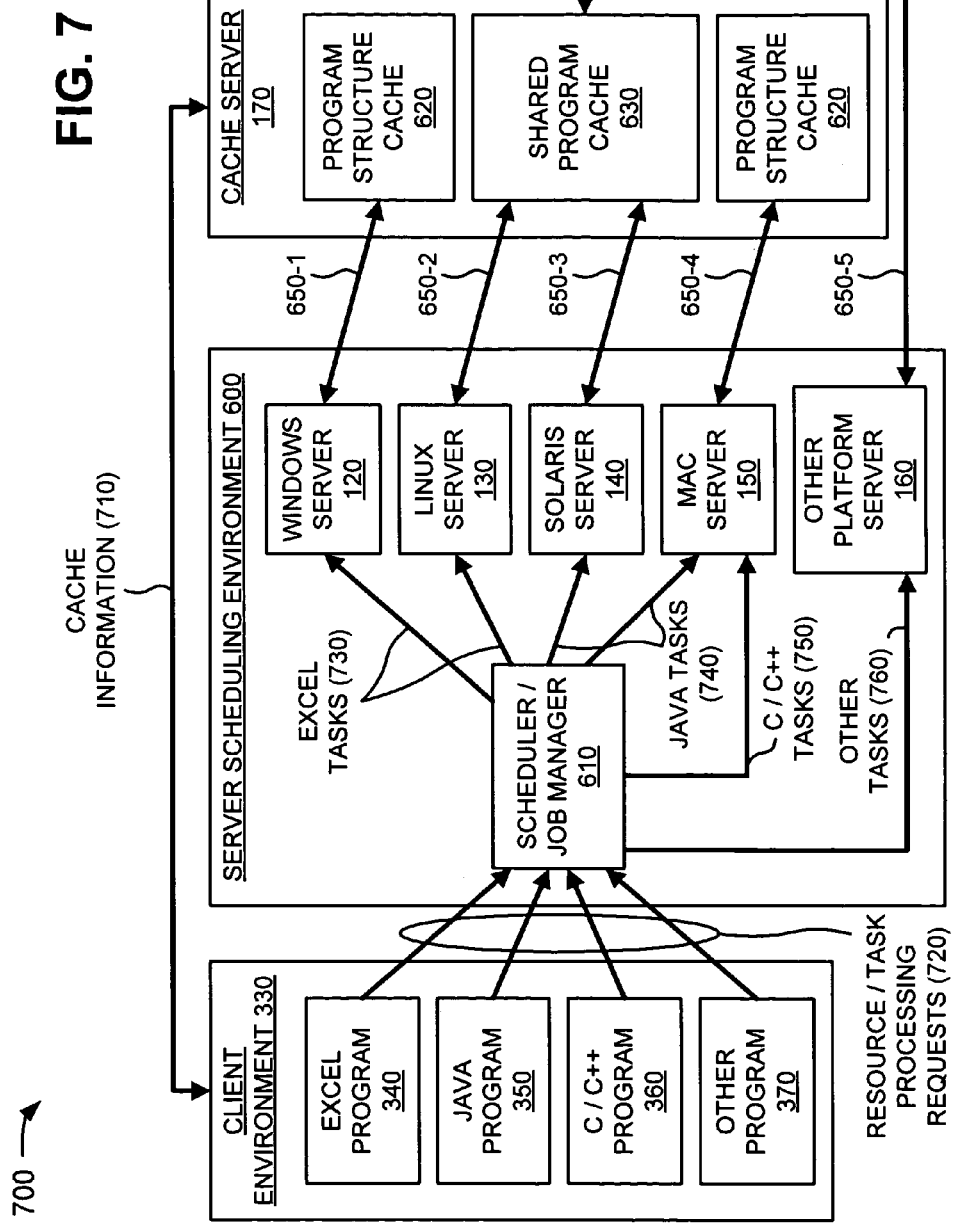
FIG. 7 depicts an exemplary diagram of interactions between a client environment of the client illustrated in FIG. 3 and the server scheduling environment and cache server illustrated in FIG. 6.

FIG. 7 depicts an exemplary diagram 700 of interactions between client environment 330, server scheduling environment 600, and cache server 170. Client environment 330 may include the features described above in connection with FIG. 3. Server scheduling environment 600 and cache server 170 may include features described above in connection with FIG. 6.

As shown in FIG. 7, client environment 330 (e.g., Excel program 340, Java program 350, C/C++ program 360, and/or other program 370) may exchange cache information 170 with cache server 170 (e.g., with program structure cache 620 and/or shared program cache 630). Cache information 710 may include executable content common to multiple parallel and/or distributed programs (e.g., client programs, such as client program 460) and/or license information associated with the executable content.

Client environment 330 (e.g., Excel program 340, Java program 350, C/C++ program 360, and/or other program 370) may provide resource and/or task processing requests 720 to scheduler/job manager 610 of server scheduling environment 600. Resource/task processing requests 720 may include requests for hardware resources (e.g., to execute client programs), requests to execute client programs, one or more portions of client programs, etc. Scheduler/job manager 610 may receive resource/task processing requests 720, and may determine an allocation strategy for resource/task processing requests 720 based on available hardware resources (e.g., servers 120-160) and resource/task processing requests 720. For example, scheduler/job manager 610 may allocate Excel tasks 730 (e.g., associated with an Excel-based client program) to Windows server 120 and Linux server 130, may allocate Java tasks 740 (e.g., associated with a Java-based client program) to Solaris server 140 and Macintosh server 150, may allocate C/C++ tasks 750 (e.g., associated with a C/C++-based client program) to Macintosh server 150, and may allocate other tasks 760 (e.g., associated with another client program) to other platform server 160.

As further shown in FIG. 7, cache server 170 (e.g., program structure cache 620 and shared program cache 630) may communicate cache/license information 650-1, . . . , 650-5 with servers 120-160. For example, servers 120-160 may request executable content associated with processing tasks 730-760 from cache server 170 via cache/license information 650-1, . . . , 650-5. If cache server 170 contains the requested executable content, cache server 170 may provide the requested executable content to servers 120-160 via cache/license information 650-1, . . . , 650-5. If cache server 170 does not contain the request executable content, servers 120-170 may request the executable content directly from client 110, and client 110 may provide the requested executable content.

The system depicted in FIG. 7, and described herein, may provide an automatic, efficient, resource management and distribution system for computational state and tasks (e.g., client programs). A user may need to only identify the servers to be used. Alternatively and/or additionally, the servers may be automatically identified (e.g., by scheduler/job manager 610). The system may automatically transfer the required executable content from client 110 to servers 120-160. The system may automatically integrate license and executable content to enable client programs to operate independent of server platform and to be robust to server failure. For example, if a client program is executing on a server that fails, the client program's computational state may be transferred to another server and the computation may be resumed.

Although FIG. 7 shows exemplary interactions between client environment 330, server scheduling environment 600, and cache server 170, in other implementations, fewer, different, or additional interactions may occur between client environment 330, server scheduling environment 600, and cache server 170 than depicted in FIG. 7.

Figure 8:
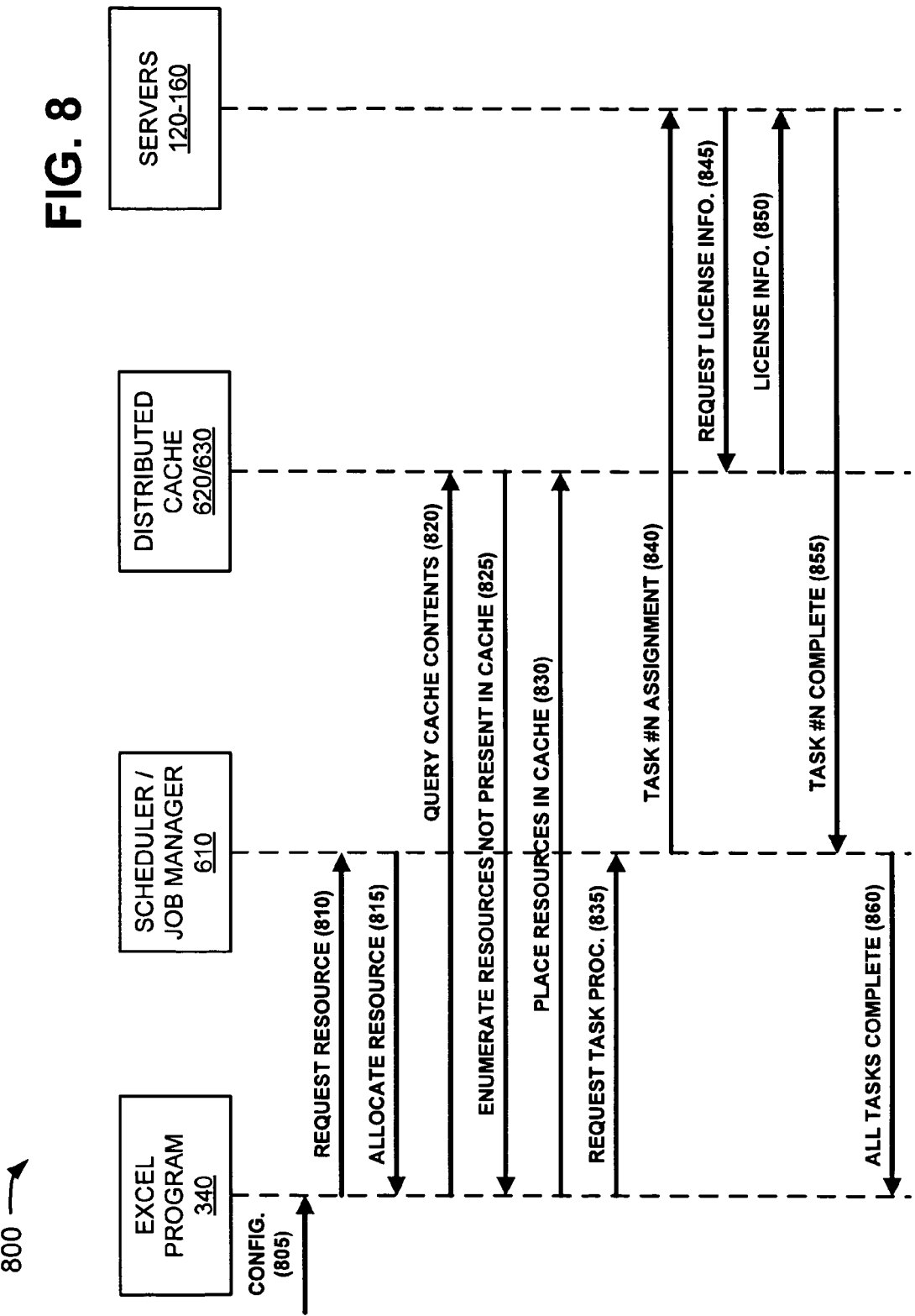
FIG. 8 illustrates an exemplary diagram of interactions between a program associated with the client depicted in FIG. 3, a scheduler/job manager associated with the server scheduling environment depicted in FIG. 6, a distributed cache associated with the cache server depicted in FIG. 6, and servers of the network depicted in FIG. 1.

FIG. 8 illustrates an exemplary diagram 800 of interactions between Excel program 340, scheduler/job manager 610, distributed cache (e.g., program structure cache 620 and/or shared program cache 630), and servers 120-160. As shown, Excel program 340 may receive configuration information 805 associated with hardware resources (e.g., servers 120-160), and may provide a request 810 for a resource to scheduler/job manager 610. If the requested resource is available, scheduler/job manager 610 may allocate the resource, as indicated by reference number 815, to Excel program 340. Excel program 340 may provide a query 820 for cache contents (e.g., associated with Excel program 340) to distributed cache 620/630, and distributed cache 620/630 may enumerate resources (e.g., executable content, data, etc.) not present in cache, as indicated by reference number 825. Excel program 340 may provide the enumerated resources to distributed cache 620/630, as indicated by reference number 830.

As further shown in FIG. 8, Excel program 340 may provide a request 835 for task processing to scheduler/job manager 610, and scheduler/job manager 610 may provide a task assignment (e.g., "#N") 840 to servers 120-160. In one example, scheduler/job manager 610 may automatically distribute request 835 for task processing across multiple heterogeneous server platforms (e.g., servers 120-160) based on request 835. Task assignment 840 may include a portion of the task processing requested by Excel program 340. Before executing task assignment 840, servers 120-160 may provide a request 845 for license information associated with task assignment 840 to distributed cache 620/630. Distributed cache 620/630 may provide the requested license information, as indicated by reference number 850, and servers 120-160 may execute task assignment 840. When execution of task assignment 840 is complete, servers 120-160 may provide an indication that the task is complete to scheduler/job manager 610, as indicated by reference number 855. This process may continue until the task processing is complete (i.e., until all tasks are complete). When servers 120-160 have executed all tasks, scheduler/job manager 610 may inform Excel program 340 that all tasks are complete, as indicated by reference number 860, and may provide results of the completed tasks to Excel program 340.

Although FIG. 8 shows exemplary interactions between Excel program 340, scheduler/job manager 610, distributed cache 620/630, and servers 120-160, in other implementations, fewer, different, or additional interactions may occur between Excel program 340, scheduler/job manager 610, distributed cache 620/630, and servers 120-160 than depicted in FIG. 8.

Exemplary Processes

Figure 9:
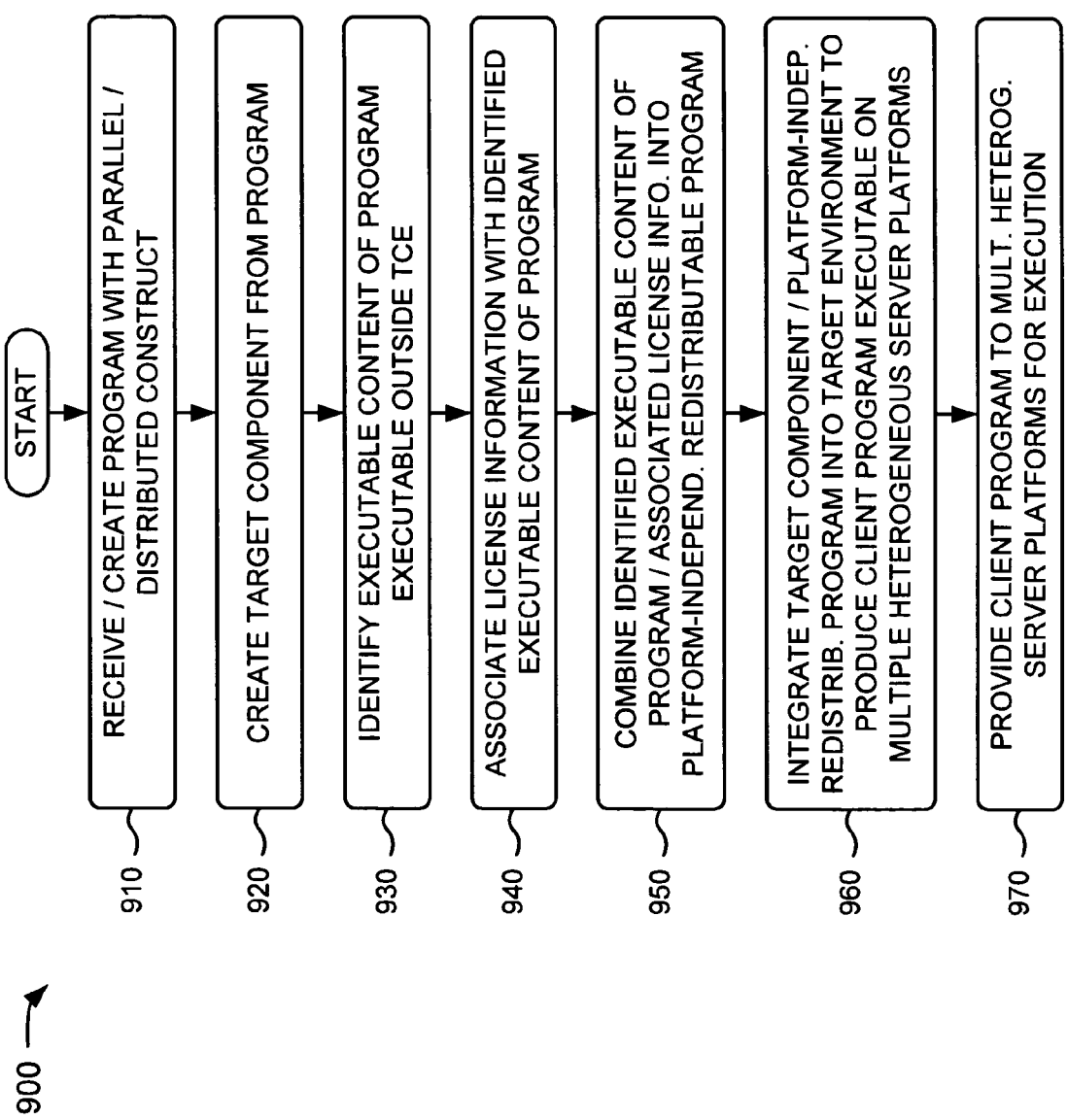
Figure 10:
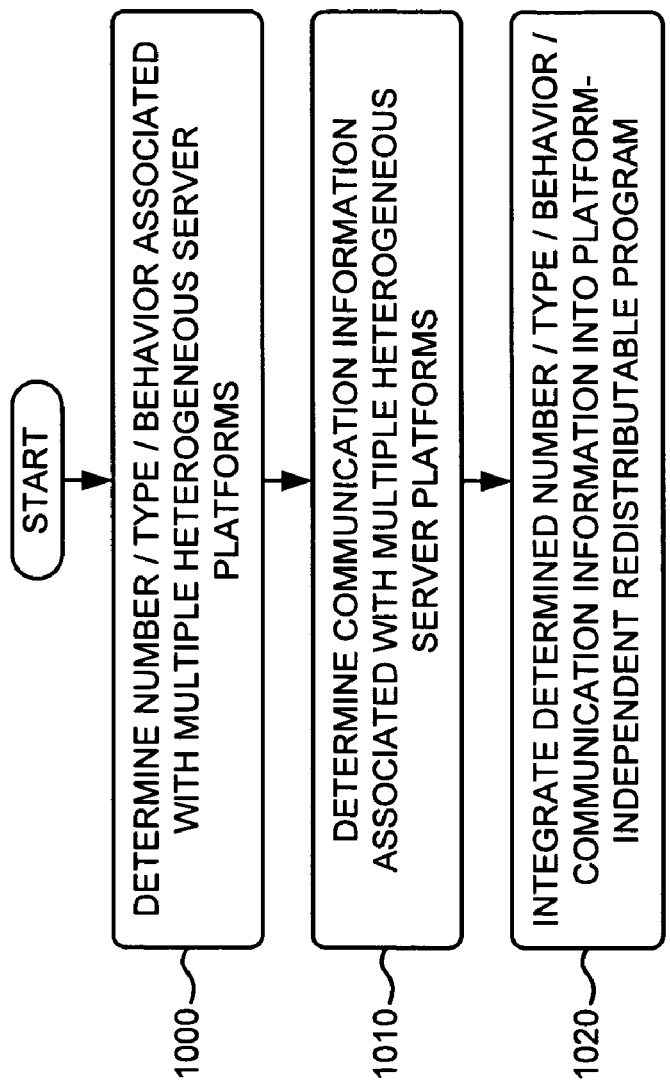
Figure 11:
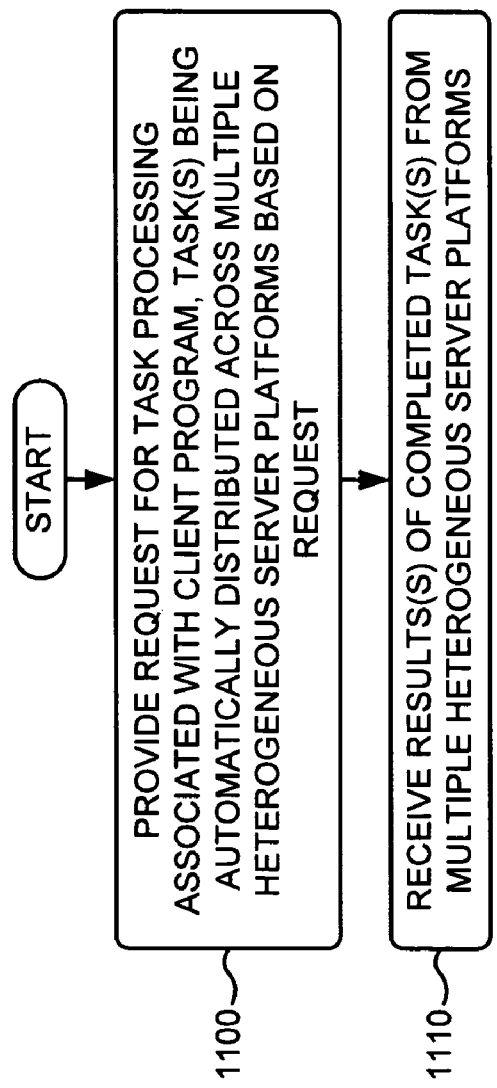

FIGS. 9-11 depict a flow chart of an exemplary process 900 for producing a client program that may be executable on multiple heterogeneous server platforms, according to implementations described herein. In one implementation, process 900 may be performed by client 110. In another implementation, some or all of process 900 may be performed by another device or group of devices, including or excluding client 110.

As illustrated in FIG. 9, process 900 may begin with receipt or creation of a program with a parallel construct or a distributed construct (block 910), creation of a target component from the program (block 920), and identification of executable content of the program that is executable outside a technical computing environment (block 930). For example, in implementations described above in connection with FIGS. 3 and 5, each of TCE programs 310 may include a program capable of being created with and/or generated by technical computing environment 300. In one example, each of TCE programs 310 may include a program with one or more parallel processing constructs that enable the one or more portions of the program to be executed in parallel with multiple hardware resources (e.g., one or more of servers 120-160). In another example, each of TCE programs may include a program with one or more distributed computing constructs that enable the one or more portions of the program to be executed in a distributed manner with multiple hardware resources (e.g., one or more of servers 120-160). TCE compiler/builder logic 320 of client 110 may receive TCE programs 310, and may process TCE programs 310 to create target components (e.g., plugins) for integration into client environment 330. Program structure computer logic 500 of client 110 may receive TCE program 310, and may determine executable content of TCE program 310 that may executed be outside TCE 300, as indicated by reference number 540.

As further shown in FIG. 9, license information may be associated with the identified executable content of the program (block 940), and the identified executable content of the program and the associated license information may be combined into a platform-independent, redistributable program (block 950). For example, in implementations described above in connection with FIG. 5, license information associator logic 510 of client 110 may receive identified executable content 540, and may associate license information, as indicated by reference number 560, with identified executable content 540. Executable content packager logic 520 of client 110 may receive identified executable content 540, information 550, and associated license information 560, and may combine identified executable content 540, information 550, and associated license information 560 into platform-independent, redistributable program 570.

Returning to FIG. 9, the target component and/or the platform-independent, redistributable program may be integrated into a target environment to produce a client program executable on multiple heterogeneous server platforms (block 960), and the client program may be provided to the multiple heterogeneous server platforms for execution (block 970). For example, in implementations described above in connection with FIGS. 4 and 5, target component integrator logic 420 of client 110 may integrate target component 450 into target environment 440 to create client program 460 executable on multiple heterogeneous platform servers (e.g., servers 120-160). Platform-independent, redistributable program 570 may include target component 450. Executable content packager logic 520 of client 110 may provide platform-independent, redistributable program 570 to target component integrator logic 420. Target component integrator logic 420 may integrate platform-independent, redistributable program 570 into target environment 440 to create client program 460.

Process block 950 may include the process blocks illustrated in FIG. 10. As shown in FIG. 10, process block 950 may include determining a number, a type, and/or a behavior associated with the multiple heterogeneous server platforms (block 1000), determining communication information associated with the multiple heterogeneous server platforms (block 1010), and integrating the determined number, type, behavior, and/or communication information associated into the platform-independent, redistributable program (block 1020). For example, in implementations described above in connection with FIG. 5, program structure computer logic 500 of client 110 may determine, based on TCE program 310, a number, types, behavior (e.g., failover support, etc.), and/or communication information, as indicated by reference number 550, associated with available hardware resources (e.g., servers 120-160). Program structure computer logic 500 may provide information 550 to executable content packager logic 520. Executable content packager logic 520 may receive identified executable content 540, information 550, and associated license information 560, and may combine identified executable content 540, information 550, and associated license information 560 into a platform-independent, redistributable program 570.

Process block 970 may include the process blocks illustrated in FIG. 11. As shown in FIG. 11, process block 970 may include providing a request for task processing associated with the client program, where the tasks are automatically distributed across the multiple heterogeneous server platforms based on the request (block 1100), and receiving one or more results associated with one or more completed task(s) from the multiple heterogeneous server platforms (block 1110). For example, in implementations described above in connection with FIG. 8, Excel program 340 may provide request 835 for task processing to scheduler/job manager 610, and scheduler/job manager 610 may provide task assignment 840 to servers 120-160. In one example, scheduler/job manager 610 may automatically distribute request 835 for task processing across multiple heterogeneous server platforms (e.g., servers 120-160) based on request 835. When execution of task assignment 840 is complete, servers 120-160 may provide an indication that the task is complete to scheduler/job manager 610, as indicated by reference number 855. This process may continue until the task processing is complete (i.e., until all tasks are complete). When servers 120-160 have executed all tasks, scheduler/job manager 610 may inform Excel program 340 that all tasks are complete, as indicated by reference number 860, and may provide results of the completed tasks to Excel program 340.

Figure 12:
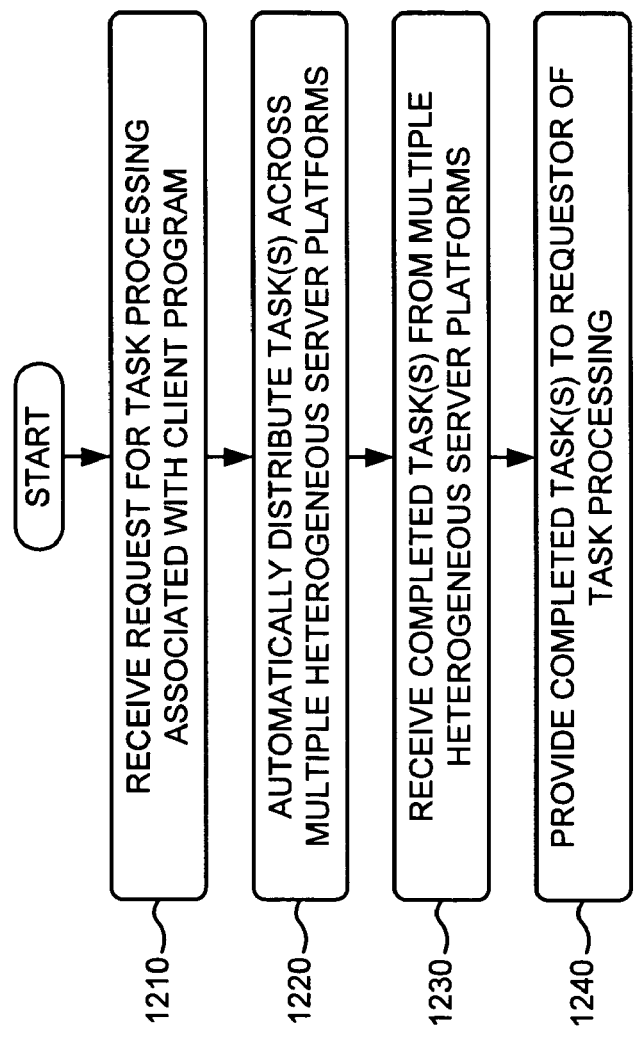
Figure 13:
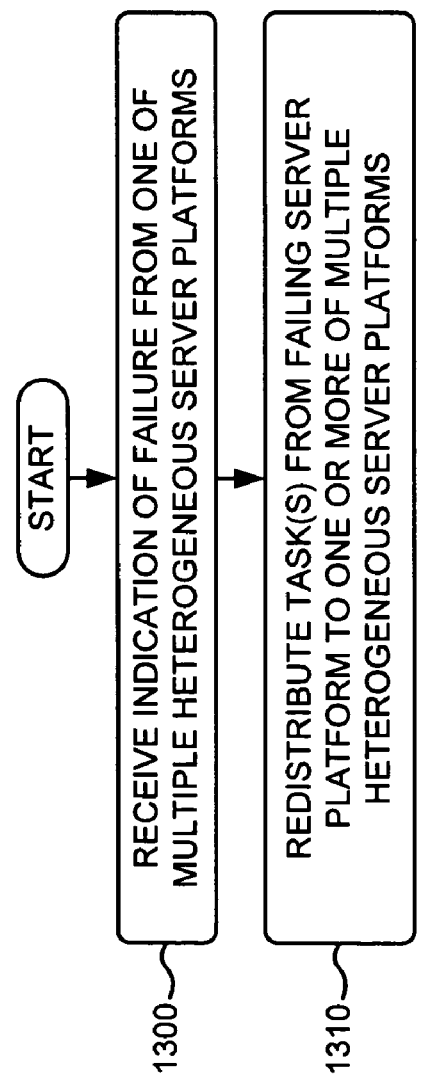

FIGS. 12 and 13 depict a flow chart of an exemplary process 1200 for executing a client program on multiple heterogeneous server platforms, according to implementations described herein. In one implementation, process 1200 may be performed by scheduler/job manager 610. In another implementation, some or all of process 1200 may be performed by another device or group of devices, including or excluding scheduler/job manager 610.

As illustrated in FIG. 12, process 1200 may begin with receiving a request for task processing associated with a client program (block 1210), and automatically distributing one or more tasks across multiple heterogeneous server platforms (block 1220). For example, in implementations described above in connection with FIG. 8, Excel program 340 may provide request 835 for task processing to scheduler/job manager 610, and scheduler/job manager 610 may provide task assignment 840 to servers 120-160. In one example, scheduler/job manager 610 may automatically distribute request 835 for task processing across multiple heterogeneous server platforms (e.g., servers 120-160) based on request 835.

As further shown in FIG. 12, one or more completed tasks may be received from the multiple heterogeneous server platforms (block 1230), and the one or more completed tasks may be provided to the requestor of the task processing (block 1240). For example, in implementations described above in connection with FIG. 8, when execution of task assignment 840 is complete, servers 120-160 may provide an indication that the task is complete to scheduler/job manager 610, as indicated by reference number 855. This process may continue until the task processing is complete (i.e., until all tasks are complete). When servers 120-160 have executed all tasks, scheduler/job manager 610 may inform Excel program 340 that all tasks are complete, as indicated by reference number 860, and may provide results of the completed tasks to Excel program 340.

Process block 1220 may include the process blocks illustrated in FIG. 13. As shown in FIG. 13, process block 1220 may include receiving an indication of failure from one of the multiple heterogeneous server platforms (block 1300), and redistributing the one or more tasks from the failing server platform to one or more of the multiple heterogeneous server platforms (block 1310). For example, in implementations described above in connection with FIG. 7, the system described herein may provide an automatic, efficient, resource management and distribution system for computational state and tasks (e.g., client programs). The system may automatically transfer the required executable content from client 110 to servers 120-160. The system may automatically integrate license and executable content to enable client programs to operate independent of server platform and to be robust to server failure. In one example, if a client program is executing on a server that fails, the client program's computational state may be transferred to another server and the computation may be resumed.

FIG. 14 depicts a flow chart of an exemplary process 1400 for executing a client program on multiple heterogeneous server platforms, according to implementations described herein. In one implementation, process 1400 may be performed by cache sever 170. In another implementation, some or all of process 1400 may be performed by another device or group of devices, including or excluding cache server 170.

As illustrated in FIG. 14, process 1400 may begin with receipt of task information associated with execution of a client program by one or more of multiple heterogeneous server platforms (block 1410), and determination of executable content, associated with the client program, that is absent from one or more of the multiple heterogeneous server platforms based on the task information (block 1420). For example, in implementations described above in connection with FIG. 8, Excel program 340 may provide a query 820 for cache contents (e.g., associated with Excel program 340) to distributed cache 620/630, and distributed cache 620/630 may enumerate resources (e.g., executable content, data, etc.) not present in cache, as indicated by reference number 825.

As further shown in FIG. 14, the absent executable content may be received from the client program (block 1430), and the absent executable content may be provided to one or more of the multiple heterogeneous server platforms (block 1440). For example, in implementations described above in connection with FIGS. 6 and 8, Excel program 340 may provide the enumerated resources to distributed cache 620/630, as indicated by reference number 830. Distributed cache 620/630 may provide resources 830 to servers 120-160. Cache server 170 (e.g., program structure cache 620 and/or shared program cache 630) may reduce the cost of client (e.g., client 110) to server (e.g., servers 120-160) file transfer by requiring client 110 to transfer only executable content that is not present in cache server 170.

CONCLUSION

Implementations described herein may include systems and/or methods that produce a client program that may be executable on multiple heterogeneous server platforms. For example, in one implementation, the systems and/or methods may receive and/or create a program (e.g., a technical computing environment (TCE) program) with a parallel or distributed construct, and may create a target component from the program. The systems and/or methods may identify executable content of the program executable outside the TCE, and may associate license information with the identified executable content of the program. The systems and/or methods may also combine the identified executable content of the program and the associated license information into a platform-independent, redistributable program, and may integrate the target component and the platform-independent, redistributable program into a target environment to produce a client program executable on multiple heterogeneous server platforms. The systems and/or methods may provide the client program to the multiple heterogeneous server platforms for execution.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-14, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method comprising:
    receiving a program that includes one of a parallel construct or a distributed construct, the receiving being performed by the computing device;
    creating a target component from the program, the creating being performed by the computing device;
    integrating the target component into a target environment to produce a client program that is executable on multiple heterogeneous server platforms, the multiple heterogeneous server platforms including a non-homogeneous set of Turing-complete computing resources capable of communicating with one another and the integrating being performed by the computing device;
    providing a request for task processing associated with the client program to the multiple heterogeneous server platforms, one or more tasks being automatically distributed across the multiple heterogeneous server platforms based on the request, the providing being performed by the computing device; and
    receiving one or more results of one or more completed tasks from the multiple heterogeneous server platforms, the receiving being performed by the computing device.

2. The computing device-implemented method of claim 1, further comprising:
    identifying executable content of the program that is executable outside a technical computing environment;
    associating license information with the identified executable content of the program;
    combining the identified executable content of the program and the associated license information into a platform-independent, redistributable program; and
    integrating the target component and the platform-independent, redistributable program into the target environment to produce the client program that is executable on the multiple heterogeneous server platforms.

3. The computing device-implemented method of claim 2, further comprising:
determining one or more of a number, a type, or a behavior associated with the multiple heterogeneous server platforms;
determining communication information associated with the multiple heterogeneous server platforms; and
integrating the determined one or more of the number, the type, or the behavior associated with the multiple heterogeneous server platforms and the determined communication information associated with the multiple heterogeneous server platforms into the platform-independent, redistributable program.

4. The computing device-implemented method of claim 1, further comprising:
providing configuration information for the client program, the configuration information enabling the client program to arbitrarily target one or more of the multiple heterogeneous server platforms for execution.

5. The computing device-implemented method of claim 4, where the configuration information enables the client program to execute serially when none of the multiple heterogeneous server platforms is available to execute the client program.

6. The computing device-implemented method of claim 5, where the configuration information enables the client program to select, at a time of execution, between serial execution and arbitrarily targeting one or more of the multiple heterogeneous server platforms for execution.

7. The computing device-implemented method of claim 1, where the program comprises a program generated with a technical computing environment.

8. The computing device-implemented method of claim 7, where the technical computing environment comprises at least one of:
a text-based environment;
a graphically-based environment; or
a hybrid environment that includes a text-based environment and a graphically-based environment.

9. The computing device-implemented method of claim 1, where the target environment comprises an environment that supports integration of a software component into the client program via one or more computer programming languages.

10. The computing device-implemented method of claim 9, where each of the one or more computer programming languages is defined by a Type-0 grammar from Chomsky hierarchy of formal languages.

11. The computing device-implemented method of claim 10, where each Type-0 grammar defines each of the one or more computer programming languages with a programming model, a type management model, and an instruction execution model.

12. The computing device-implemented method of claim 11, where the programming model is one of functional, object-oriented, procedural, rule based, logic based, or multi-paradigm.

13. The computing device-implemented method of claim 11, where the type management model is one of untyped, static, dynamic, or hybrid.

14. The computing device-implemented method of claim 11, where the instruction execution model is one of sequential or parallel.

15. The computing device-implemented method of claim 9, where each of the one or more computer programming languages comprises one or more of:
a C programming language;
a C++ programming language;
a Csharp programming language;
a Java programming language;
a Visual Basic programming language;
a .NET framework programming language;
a Python programming language;
a F++ programming language;
a Fsharp programming language;
a Fortress programming language; or
a Perl programming language.

16. The computing device-implemented method of claim 1, where each member of the non-homogeneous set of Turing-complete computing resources supports server program execution via an operating system.

17. The computing device-implemented method of claim 16, where each operating system comprises one or more of:
a Linux operating system;
a Windows operating system;
a Solaris operating system; or
a Macintosh operating system.

18. A computing device-implemented method comprising:
receiving a request for task processing associated with a client program integrated into a target environment, the receiving being performed by the computing device, the request for task processing comprising one of:
a request for processing one or more tasks in a distributed manner across the multiple heterogeneous server platforms; or
a request for processing one or more tasks in a parallel manner across the multiple heterogeneous server platforms;
automatically providing, based on the request, the one or more tasks across multiple heterogeneous server platforms, the multiple heterogeneous server platforms including a non-homogeneous set of Turing-complete computing resources capable of communicating with one another, the providing being performed by the computing device, and the automatically providing, based on the request, one or more tasks across the multiple heterogeneous server platforms comprising one of:
automatically providing, based on the request, the one or more tasks in a distributed manner across the multiple heterogeneous server platforms; or
automatically providing, based on the request, the one or more tasks in a parallel manner across the multiple heterogeneous server platforms;
receiving one or more results from the multiple heterogeneous server platforms, the receiving being performed by the computing device; and
providing the one or more results to a requestor of the task processing, the providing being performed by the computing device.

19. The computing device-implemented method of claim 18, where automatically providing, based on the request, one or more tasks across the multiple heterogeneous server platforms, comprises:
receiving an indication of failure from one of the multiple heterogeneous server platforms; and
redistributing one or more tasks from the one of the multiple heterogeneous server platforms to one or more other multiple heterogeneous server platforms of the multiple heterogeneous server platforms.

20. The computing device-implemented method of claim 18, where the client program comprises a program generated with a technical computing environment.

21. The computing device-implemented method of claim 20, where the technical computing environment comprises at least one of:
- a text-based environment;
- a graphically-based environment; or
- a hybrid environment that includes a text-based environment and a graphically-based environment.

22. The computing device-implemented method of claim 18, where the request for task processing comprises one of:
- a request for processing the one or more tasks in a distributed manner across the multiple heterogeneous server platforms; or
- a request for processing the one or more tasks in a parallel manner across the multiple heterogeneous server platforms.

23. The computing device-implemented method of claim 18, where the target environment is not supported on the multiple heterogeneous server platforms.

24. The computing device-implemented method of claim 18, where the target environment comprises an environment that supports integration of a software component into the client program via one or more computer programming languages.

25. The computing device-implemented method of claim 24, where each of the one or more computer programming languages is defined by a Type-0 grammar from Chomsky hierarchy of formal languages.

26. The computing device-implemented method of claim 25, where each Type-0 grammar defines each of the one or more computer programming languages with a programming model, a type management model, and an instruction execution model.

27. The computing device-implemented method of claim 26, where the programming model is one of functional, object-oriented, procedural, rule based, logic based, or multi-paradigm.

28. The computing device-implemented method of claim 26, where the type management model is one of untyped, static, dynamic, or hybrid.

29. The computing device-implemented method of claim 26, where the instruction execution model is one of sequential or parallel.

30. The computing device-implemented method of claim 24, where each of the one or more computer programming languages comprises one or more of:
- a C programming language;
- a C++ programming language;
- a Csharp programming language;
- a Java programming language;
- a Visual Basic programming language;
- a .NET framework programming language;
- a Python programming language;
- a F++ programming language;
- a Fsharp programming language;
- a Fortress programming language; or
- a Perl programming language.

31. The computing device-implemented method of claim 18, where each member of the non-homogeneous set of Turing-complete computing resources supports server program execution via an operating system.

32. The computing device-implemented method of claim 31, where each operating system comprises one or more of:
- a Linux operating system;
- a Windows operating system;
- a Solaris operating system; or
- a Macintosh operating system.

33. A computing device-implemented method comprising:
- receiving task information associated with execution of a client program on one or more multiple heterogeneous server platforms, the client program being integrated into a target environment, the multiple heterogeneous server platforms comprising a non-homogeneous set of Turing-complete computing resources capable of communicating with one another, the target environment comprising an environment that supports integration of a software component into the client program via one or more computer programming languages, and the receiving being performed by the computing device;
- determining, based on the task information, required content, associated with the client program, that is absent from the one or more of the multiple heterogeneous server platforms, the determining being performed by the computing device;
- receiving the absent required content from the client program, the receiving being performed by the computing device; and
- providing the absent required content to a cache device, the cache device providing the absent required content to the one or more of the multiple heterogeneous server platforms, the providing being performed by the computing device.

34. The computing device-implemented method of claim 33, where the target environment is not supported on the multiple heterogeneous server platforms.

35. The computing device-implemented method of claim 33, where the target environment comprises an environment that supports integration of a software component into the client program via one or more computer programming languages.

36. The computing device-implemented method of claim 35, where each of the one or more computer programming languages is defined by a Type-0 grammar from Chomsky hierarchy of formal languages.

37. The computing device-implemented method of claim 36, where each Type-0 grammar defines each of the one or more computer programming languages with a programming model, a type management model, and an instruction execution model.

38. The computing device-implemented method of claim 37, where the programming model is one of functional, object-oriented, procedural, rule based, logic based, or multi-paradigm.

39. The computing device-implemented method of claim 37, where the type management model is one of untyped, static, dynamic, or hybrid.

40. The computing device-implemented method of claim 37, where the instruction execution model is one of sequential or parallel.

41. The computing device-implemented method of claim 35, where each of the one or more computer programming languages comprises one or more of:
- a C programming language;
- a C++ programming language;
- a Csharp programming language;
- a Java programming language;
- a Visual Basic programming language;
- a .NET framework programming language;
- a Python programming language;
- a F++ programming language;
- a Fsharp programming language;
- a Fortress programming language; or
- a Perl programming language.

42. The computing device-implemented method of claim 33, where each member of the non-homogeneous set of Turing-complete computing resources supports server program execution via an operating system.

43. The computing device-implemented method of claim 42, where each operating system comprises one or more of:
a Linux operating system;
a Windows operating system;
a Solaris operating system; or
a Macintosh operating system.

44. One or more non-transitory computer-readable media storing executable instructions for execution by processing logic, the executable instructions comprising:
one or more instructions that, when executed by the processing logic, cause the processing logic to receive a program that includes one of a parallel construct or a distributed construct;
one or more instructions that, when executed by the processing logic, cause the processing logic to create a target component from the program, the target environment comprising an environment that supports integration of a software component into the client program via one or more computer programming languages;
one or more instructions that, when executed by the processing logic, cause the processing logic to integrate the target component into a target environment to produce a client program that is executable on multiple heterogeneous server platforms, where the multiple heterogeneous server platforms comprising comprise a non-homogeneous set of Turing-complete computing resources capable of communicating with one another; and
one or more instructions that, when executed by the processing logic, cause the processing logic to provide the client program to the multiple heterogeneous server platforms for execution.

45. The media of claim 44, further comprising:
one or more instructions that, when executed by the processing logic, cause the processing logic to identify executable content of the program that is executable outside a technical computing environment;
one or more instructions that, when executed by the processing logic, cause the processing logic to associate license information with the identified executable content of the program;
one or more instructions that, when executed by the processing logic, cause the processing logic to combine the identified executable content of the program and the associated license information into a platform-independent, redistributable program; and
one or more instructions that, when executed by the processing logic, cause the processing logic to integrate the target component and the platform-independent, redistributable program into the target environment to produce the client program that is executable on the multiple heterogeneous server platforms.

46. The media of claim 44, further comprising:
one or more instructions that, when executed by the processing logic, cause the processing logic to determine one or more of a number, a type, or a behavior associated with the multiple heterogeneous server platforms;
one or more instructions that, when executed by the processing logic, cause the processing logic to determine communication information associated with the multiple heterogeneous server platforms; and
one or more instructions that, when executed by the processing logic, cause the processing logic to integrate the determined one or more of the number, the type, or the behavior associated with the multiple heterogeneous server platforms and the determined communication information associated with the multiple heterogeneous server platforms into the platform-independent, redistributable program.

47. The media of claim 44, where the one or more instructions that cause the processing logic to provide the client program to the multiple heterogeneous server platforms comprise:
one or more instructions that, when executed by the processing logic, cause the processing logic to provide a request for task processing associated with the client program to the multiple heterogeneous server platforms, where one or more tasks are automatically distributed across the multiple heterogeneous server platforms based on the request; and
one or more instructions that, when executed by the processing logic, cause the processing logic to receive one or more results of one or more completed tasks from the multiple heterogeneous server platforms.

48. The media of claim 44, where the target environment is not supported on the multiple heterogeneous server platforms.

49. The media of claim 44, where the program comprises a program generated with a technical computing environment.

50. The media of claim 49, where the technical computing environment comprises at least one of:
a text-based environment;
a graphically-based environment; or
a hybrid environment that includes a text-based environment and a graphically-based environment.

51. The media of claim 44, where each of the one or more computer programming languages is defined by a Type-0 grammar from Chomsky hierarchy of formal languages.

52. The media of claim 51, where each Type-0 grammar defines each of the one or more computer programming languages with a programming model, a type management model, and an instruction execution model.

53. The media of claim 52, where the programming model is one of functional, object-oriented, procedural, rule based, logic based, or multi-paradigm.

54. The media of claim 52, where the type management model is one of untyped, static, dynamic, or hybrid.

55. The media of claim 52, where the instruction execution model is one of sequential or parallel.

56. The media of claim 51, where each of the one or more computer programming languages comprises one or more of:
a C programming language;
a C++ programming language;
a Csharp programming language;
a Java programming language;
a Visual Basic programming language;
a .NET framework programming language;
a Python programming language;
a F++ programming language;
a Fsharp programming language;
a Fortress programming language;
or a Perl programming language.

57. The media of claim 44, where each member of the non-homogeneous set of Turing-complete computing resources supports server program execution via an operating system.

58. The media of claim 57, where each operating system comprises one or more of:
a Linux operating system;
a Windows operating system;
a Solaris operating system; or
a Macintosh operating system.

59. One or more non-transitory computer-readable media storing executable instructions for execution by a processor the executable instructions comprising:
- one or more instructions, that, when executed by the processing logic, cause the processing logic to receive a request for task processing associated with a client program that is integrated into a target environment, the target environment comprising an environment that supports integration of a software component into the client program via one or more computer programming languages;
- one or more instructions, that, when executed by the processing logic, cause the processing logic to automatically provide, based on the request, one or more tasks across multiple heterogeneous server platforms, where the multiple heterogeneous server platforms comprise a non-homogeneous set of Turing-complete computing resources capable of communicating with one another;
- one or more instructions, that, when executed by the processing logic, cause the processing logic to receive one or more results from the multiple heterogeneous server platforms; and
- one or more instructions, that, when executed by the processing logic, cause the processing logic to provide the one or more results to the requestor of the task processing.

60. The media of claim 59, where the one or more instructions that cause the processing logic to automatically provide, based on the request, one or more tasks across the multiple heterogeneous server platforms, comprise:
- one or more instructions that, when executed by the processing logic, cause the processing logic to receive an indication of failure from one of the multiple heterogeneous server platforms; and
- one or more instructions that, when executed by the processing logic, cause the processing logic to redistribute one or more tasks from the one of the multiple heterogeneous server platforms to one or more of the other multiple heterogeneous server platforms.

61. The media of claim 59, where the program comprises a program generated with a technical computing environment.

62. The media of claim 61, where the technical computing environment comprises at least one of:
- a text-based environment;
- a graphically-based environment; or
- a hybrid environment that includes a text-based environment and a graphically-based environment.

63. The media of claim 59, where the request for task processing comprises one of:
- a request for processing the one or more tasks in a distributed manner across the multiple heterogeneous server platforms; or
- a request for processing the one or more tasks in a parallel manner across the multiple heterogeneous server platforms.

64. The media of claim 63, where the one or more instructions that cause the processing logic to automatically provide, based on the request, one or more tasks across the multiple heterogeneous server platforms comprise:
- one of one or more instructions that, when executed by the processing logic, cause the processing logic to automatically provide, based on the request, the one or more tasks in a distributed manner across the multiple heterogeneous server platforms; or
- one of one or more instructions that, when executed by the processing logic, cause the processing logic to automatically provide, based on the request, the one or more tasks in a parallel manner across the multiple heterogeneous server platforms.

65. The media of claim 59, where the target environment is not supported on the multiple heterogeneous server platforms.

66. The media of claim 59, where each of the one or more computer programming languages is defined by a Type-0 grammar from Chomsky hierarchy of formal languages.

67. The media of claim 66, where each Type-0 grammar defines each of the one or more computer programming languages with a programming model, a type management model, and an instruction execution model.

68. The media of claim 67, where the programming model is one of functional, object-oriented, procedural, rule based, logic based, or multi-paradigm.

69. The media of claim 67, where the type management model is one of untyped, static, dynamic, or hybrid.

70. The media of claim 67, where the instruction execution model is one of sequential or parallel.

71. The media of claim 59, where each of the one or more computer programming languages comprises one or more of:
- a C programming language;
- a C++ programming language;
- a Csharp programming language;
- a Java programming language;
- a Visual Basic programming language;
- a .NET framework programming language;
- a Python programming language;
- a F++ programming language;
- a Fsharp programming language;
- a Fortress programming language;
- or a Perl programming language.

72. The media of claim 59, where each member of the non-homogeneous set of Turing-complete computing resources supports server program execution via an operating system.

73. The media of claim 72, where each operating system comprises one or more of:
- a Linux operating system;
- a Windows operating system;
- a Solaris operating system; or
- a Macintosh operating system.

74. A system for producing a client program that is executable on multiple heterogeneous server platforms, comprising:
- means for receiving a program that includes one of a parallel construct or a distributed construct;
- means for creating a target component from the program;
- means for integrating the target component into a target environment to produce the client program that is executable on the multiple heterogeneous server platforms, where the multiple heterogeneous server platforms comprising comprise a non-homogeneous set of Turing-complete computing resources capable of communicating with one another;
- means for providing a request for task processing associated with the client program to the multiple heterogeneous server platforms, one or more tasks being automatically distributed across the multiple heterogeneous server platforms based on the request; and
- means for receiving one or more results of one or more completed tasks from the multiple heterogeneous server platforms.

* * * * *